(12) United States Patent
Takahashi et al.

(10) Patent No.: US 7,409,148 B2
(45) Date of Patent: Aug. 5, 2008

(54) WATERPROOF TYPE ELECTRONIC DEVICE

(75) Inventors: Nobutatsu Takahashi, Tokyo (JP); Seiya Amatatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 11/267,105

(22) Filed: Nov. 7, 2005

(65) Prior Publication Data
US 2006/0098966 A1    May 11, 2006

(30) Foreign Application Priority Data

| Nov. 8, 2004 | (JP) | ............................ P2004-324174 |
| Nov. 11, 2004 | (JP) | ............................ P2004-328152 |

(51) Int. Cl.
*G03B 17/08* (2006.01)
*G03B 17/02* (2006.01)

(52) U.S. Cl. ............................ 396/29; 396/539; 348/81; 348/376; 358/906; 358/909.1; 206/811

(58) Field of Classification Search ................... 396/29, 396/25, 27, 420, 539; 348/81, 333.01, 333.11, 348/373, 376; 358/906, 909.1; 206/811
See application file for complete search history.

(56) References Cited

U.S. PATENT DOCUMENTS 5,610,655 A * 3/1997 Wakabayashi et al. ...... 348/373

FOREIGN PATENT DOCUMENTS

| JP | 51-144131 | 12/1976 |
| JP | 54-129802 | 10/1979 |
| JP | 60-172144 | 11/1985 |
| JP | 61-179712 | 8/1986 |
| JP | 61-200665 | 9/1986 |
| JP | 03-159715 | 7/1991 |
| JP | 03-159716 | 7/1991 |
| JP | 04-052631 | 2/1992 |

(Continued)

OTHER PUBLICATIONS

Office Action issued by the Japanese Patent Office mailed on Mar. 25, 2008, for corresponding Japanese Patent Application No. 2004-328152.

*Primary Examiner*—Rochelle-Ann Blackman
(74) *Attorney, Agent, or Firm*—Finnegan, Henderson, Farabow, Garrett & Dunner, L.L.P.

(57) ABSTRACT

A waterproof type electronic device is composed of a disc lid 13 capable of opening and closing an opening portion (17) of a camera apparatus body (2), a buckle (12) capable of detachably fastening the disc lid (13) to the camera apparatus body (2) and a sealing member (24) provided on at least one of the buckle (12) and the camera apparatus body (2) to hermetically seal the buckle 12 and the camera apparatus body (2). When the disc lid (13) is fastened to the camera apparatus body (2) by the buckle (12), the camera apparatus body (2) is hermetically sealed at least at its part of the portion covered with the buckle (12). In this kind of related-art waterproof type electronic device, operation buttons are not formed so as to have waterproof structures and water and water component can therefore enter this waterproof type electronic device relatively easily. If the operation buttons are formed so as to have waterproof structures, then such waterproof structures are increased in space from a structure standpoint and hence the overall arrangement of the apparatus may not be made compact in size.

6 Claims, 14 Drawing Sheets

FOREIGN PATENT DOCUMENTS

| | | |
|---|---|---|
| JP | 04-120881 | 4/1992 |
| JP | 04-130869 | 5/1992 |
| JP | 05-67103 | 9/1993 |
| JP | 05-290563 | 11/1993 |
| JP | 06-2885 | 1/1994 |
| JP | 06-102571 | 4/1994 |
| JP | 06-318790 | 11/1994 |
| JP | 07-131693 | 5/1995 |
| JP | 07-159870 | 6/1995 |
| JP | 08-20082 | 1/1996 |
| JP | 08-148856 | 6/1996 |
| JP | 09-050794 | 2/1997 |
| JP | 10-055607 | 2/1998 |
| JP | 2000-013043 | 1/2000 |
| JP | 3019652 | 1/2000 |
| JP | 2000-209473 | 7/2000 |
| JP | 2000-299805 | 10/2000 |
| JP | 2001-056055 | 2/2001 |
| JP | 2001-179772 | 7/2001 |
| JP | 2002-180032 | 6/2002 |
| JP | 2003-85957 | 3/2003 |
| JP | 2003-085957 | 3/2003 |
| JP | 2003-288772 | 10/2003 |
| JP | 2004-179850 | 6/2004 |
| JP | 2006-106428 | 4/2006 |

\* cited by examiner

WATERPROOF TYPE ELECTRONIC DEVICE

CROSS REFERENCES TO RELATED APPLICATIONS

The present invention contains subject matter related to Japanese Patent Application JP 2004-324174 filed in the Japanese Patent Office on Nov. 8, 2004 and Japanese Patent Application JP 2004-328152 filed in the Japanese Patent Office on Nov. 11, 2004 the entire contents of which being incorporated herein by reference.

BACKGROUND OF THE INVENTION

1. Field of the Invention

The present invention relates to a waterproof type electronic device having a sealing member closely attached to a buckle and an electronic device body to achieve a waterproof function or a water-resistant function by which the electronic device body can be hermetically closed at least at its part covered with the buckle when the buckle is closed.

2. Description of the Related Art

Cited Patent Reference 1, for example, has described this kind of a waterproof type electronic device so far. The Cited Patent Reference 1 has described a disc recording and/or reproducing apparatus which the assignee of the present application has previously proposed as the patent application. This disc recording and/or reproducing apparatus includes a disc loading portion to which a disc-like recording medium is loaded detachably and this disc loading potion can be opened and closed freely by an openable and closable lid.

The disc recording and/or reproducing apparatus on this Cited Patent Reference 1 is characterized by a player main body having an openable and closable lid to freely open and close a disc loading potion to which a disc-like recording medium is detachably loaded and a buckle which can hold the opening and closing lid, the opening and closing lid being locked by the buckle.

According to the disc recording and/or reproducing apparatus having the above-mentioned arrangement, there can be achieved the effect in which since the buckle is not opened by a certain strong force, when the openable and closable lid is held firmly, the openable and closable lid may not be inadvertently opened with slight touch. Thus, the openable and closable lid is held with strong fastening force and hence it can be made difficult to open with ease.

Cited Patent Reference 2 shows another example of this kind of waterproof type electronic device according to the related art. Cited Patent Reference 2 has described a camera which the assignee of the present application has previously proposed as the patent application.

A camera described in this Cited Patent Reference 2 includes an oblong case having a width and a thickness and a length larger than these width and thickness, a camera lens provided at the front surface of the case located at one of thickness direction, an image pickup element provided within the case to detect an object image shot through the camera lens to thereby output an image pickup signal and a display panel facing the upper portion of the back surface of the case located on the other of the thickness direction to display a picture of the object image based on the image pickup signal outputted from the image pickup element. In this camera, the display panel is constructed such that the vertical direction of the picture screen is inclined relative to the length direction of the case with a predetermined angle.

According to the camera having the above-mentioned arrangement, it is possible to provide the camera in which loads on cameraman's hand and shoulder can be decreased when cameraman holds this camera with one hand and in which camera-shock can be prevented from occurring when the cameraman presses the shutter release button.

However, both in the above-mentioned Cited Patent References 1 and 2, the respective operation buttons are not constructed so as to have waterproof structures and water and moisture can easily enter the respective operation buttons. Although it is considered to take a countermeasure to meet with the present situation so that the respective operation buttons should be constructed so as to have waterproof structures, if the operations buttons are formed as waterproof type operation buttons, it is unavoidable that the camera will become large in size in response to the number of operation buttons from a structure and space standpoints. As a result, the whole of the apparatus becomes large in size and there is a problem in which an object of miniaturizing the apparatus may not be attained.

Also, although it is customary that a lock structure of a lid which opens and closes a disc compartment portion needs overstroke, in the structure in which a packing is provided at the peripheral edge of the lid which opens and closes the disc compartment portion and in which the lid is urged against the camera body through the packing by a buckle type fastening device, it was difficult to apply uniform pressure to the packing. Therefore, it is not easy to increase properties in which the lid is closely contacted with the camera body and there is a problem in which the waterproof structure is unstable.

Further, in this kind of waterproof type electronic device, it has been customary to dry the inside of the camera body by only natural drying. Thus, when moisture is produced within the closed camera body having the waterproof structure, it takes a plenty of time to remove the moisture. Also, there exists a camera apparatus having a function to stop shooting operation, playback operation and the like after a constant time period since moisture has been produced within the camera body. Accordingly, in the case of such electronic device, there is a problem in which the electronic device is unable to resume shooting operation and the like after a constant time was passed.

Cited Patent Reference 1:

Official Gazette of Japanese laid-open patent application No. 2003-85957

Cited Patent Reference 2:

Official Gazette of Japanese laid-open patent application No. 2004-179850

The problems encountered with the related art will be described below. In this kind of waterproof type electronic device, since the respective operation buttons are not formed with the waterproof structures so that water and moisture will enter the operation buttons relatively easily, if the respective operation buttons are constructed with the waterproof structures, then such waterproof type electronic device becomes large in size from structure and space standpoints and it is not possible to miniaturize the whole of the apparatus. Further, since the lock structure of the disc lid requires the overstroke, it is difficult to increase close-contact property of the disc lid. Furthermore, since water and moisture within the camera body are removed by natural drying, it takes a lot of time to remove moisture produced within space closed by the waterproof structure.

SUMMARY OF THE INVENTION

In view of the aforesaid aspects, the present invention intends to provide a waterproof type electronic device having a structure which is high in waterproof (water-resistant) function.

The present invention intends to provide a waterproof type electronic device in which an information recording medium can be exchanged with ease.

The present invention intends to provide a waterproof type electronic device which can be kept compact in size.

The present invention intends to provide a waterproof type electronic device which can reliably and effectively prevent the occurrence of a trouble in which necessary information is not recorded on an information recording medium inadvertently.

The present invention intends to provide a waterproof type electronic device in which the moisture state within the electronic device body can be rapidly removed by circulating the air into the electronic device body.

Further, the present invention is able to realize a waterproof type electronic device, which can remove the moisture state in the early stage, by a simple structure without increasing a manufacturing cost.

Furthermore, the present invention can realize a waterproof type electronic device, which can demonstrate a positive and reliable waterproof function or water-resistant function, by a simple structure.

According to an aspect of the present invention, there is provided a waterproof type electronic device which is composed of a lid capable of opening and closing an opening portion of an electronic device body, a buckle for fastening the lid to the electronic device body such that the lid can be detachably fixed to the electronic device body and a sealing member provided on at least one of the buckle and the electronic device body so as to seal the buckle and the electronic device body hermetically, wherein at least part of the portion covered with the buckle is hermetically sealed when the lid is fastened to the electronic device body by the buckle.

In the waterproof type electronic device according to the present invention, the waterproof type electronic device is a waterproof type camera apparatus for outputting an image of a shooting object in the converted form of an electric signal and which has an information recording medium, capable of recording the electric signal, detachably attached thereto, the information recording medium being made exchangeable when the lid is opened.

In the waterproof type electronic device according to the present invention, the waterproof type electronic device further includes an operation means for opening the lid which covers the opening portion in which the information recording medium is housed and wherein the operation means is provided on the electronic device body at its portion hermetically covered with the lid.

In the waterproof type electronic device according to the present invention, the operation means includes a first operation means and a second operation means, the first operation means being composed of a recording stop switch energized to output a signal instructing predetermined information to be recorded on the information recording medium and which immediately energizes the second operation means after recording of the predetermined information was ended or after recording of the predetermined information has been ended, the second operation means being composed of a slide lever energized to release the lid from being locked to open the lid when the second operation means can be made operable by the first operation means.

In the waterproof type electronic device according to the present invention, the electronic device body has in its inside a partition member for dividing its inside space into a first chamber to house therein the information recording medium and which is covered with the lid and a second chamber hermetically covered with the buckle, the partition member having an air hole by which the first and second chambers are communicated with each other.

In the waterproof type electronic device according to the present invention, the partition member is a battery holder to which a battery is detachably attached as a power supply.

According to the waterproof type electronic device of the present invention, when the buckle is fastened and fixed to the electronic device body by urging the buckle against the electronic device body, the sealing member provided at least on one of the peripheral edge portion of the buckle and the peripheral edge portion of the opening portion of the electronic device body is closely contacted with the electronic device body or the buckle in the state in which the sealing member surrounds the opening portion and thereby at least a part of the portion covered with the buckle is hermetically closed. Therefore, the opening portion of the electronic device body can be hermetically sealed by the buckle. Thus, it is possible to provide a waterproof type electronic device having a structure excellent in waterproof (water-resistant) function by improving a waterproof function or a water-resistant function of at least a part within the buckle.

According to the waterproof type electronic device of the present invention, since the waterproof type camera apparatus to which the information recording medium is detachably attached is applied as the waterproof type electronic device having the arrangement in which the information recording medium can be exchanged when the lid is opened, the lid can be closely fastened to and fixed to the electronic device body by the buckle and the information recording medium can be exchanged with ease by opening the lid.

According to the waterproof type electronic device of the present invention, since the operation means for opening the lid covering the opening portion is located on the electronic device body at its portion hermetically covered with the buckle, waterproof function can be maintained without providing a special waterproof mechanism to the operation means. Therefore, since the operation means need not be rendered waterproof independently, the operation means can be simplified in structure and the whole of the apparatus can be kept from becoming large in size.

According to the waterproof type electronic device of the present invention, since the waterproof type electronic device includes the first operation means and the second operation means as the operation means, when the recording stop switch serving as the first operation means is operated, the second operation means is prevented from being operated by the first operation means until predetermined information is recorded on the information recording medium. After predetermined information was recorded on the information recording medium, the slide lever serving as the second operation means can be operated and the lid can be released from being locked by operating the second operation means and it becomes possible to open the lid. Thus, even when the user makes an error in operation procedure of the operation means, the lid can be prevented from being opened before necessary information is recorded on the information recording medium. Therefore, it is possible to reliably and effectively prevent the occurrence of a trouble in which necessary information is not recorded on the information recording medium.

According to the waterproof type electronic device of the present invention, since the waterproof type electronic device includes the partition member for dividing the inside space of the electronic device body into the first and second chambers and the partition member includes the air hole to communicate the first and second chambers, the second chamber hermetically covered with the buckle is communicated with the first chamber through the air hole. Thus, when the buckle is opened, the air is introduced into the electronic device body through the air hole and the moisture state in the inside can be removed in the early stage by circulating the air into the electronic device body.

Further, according to the waterproof type electronic device of the present invention, since the battery holder to which the batteries are detachably loaded is applied as the partition member, the partition member can be realized by using the existing assemblies without increasing the number of assemblies. Also, since the battery holder is provided with the air hole, the moisture state within the electronic device body can be removed quickly by only opening the buckle. Therefore, it is possible to realize the waterproof type electronic device, which can remove the moisture state quickly, by the simple structure without increasing the manufacturing cost.

Furthermore, since the electronic device body is hermetically sealed at least a part of its portion covered with the buckle by fastening the buckle when the opening portion of the electronic device body is closed by the lid, it is possible to realize the waterproof type electronic device, which can demonstrate positive and reliable waterproof function or water-resistant function, by the simple structure.

DESCRIPTION OF THE PREFERRED EMBODIMENTS

The present invention will now be described with reference to the accompanying drawings.

Figure 1:
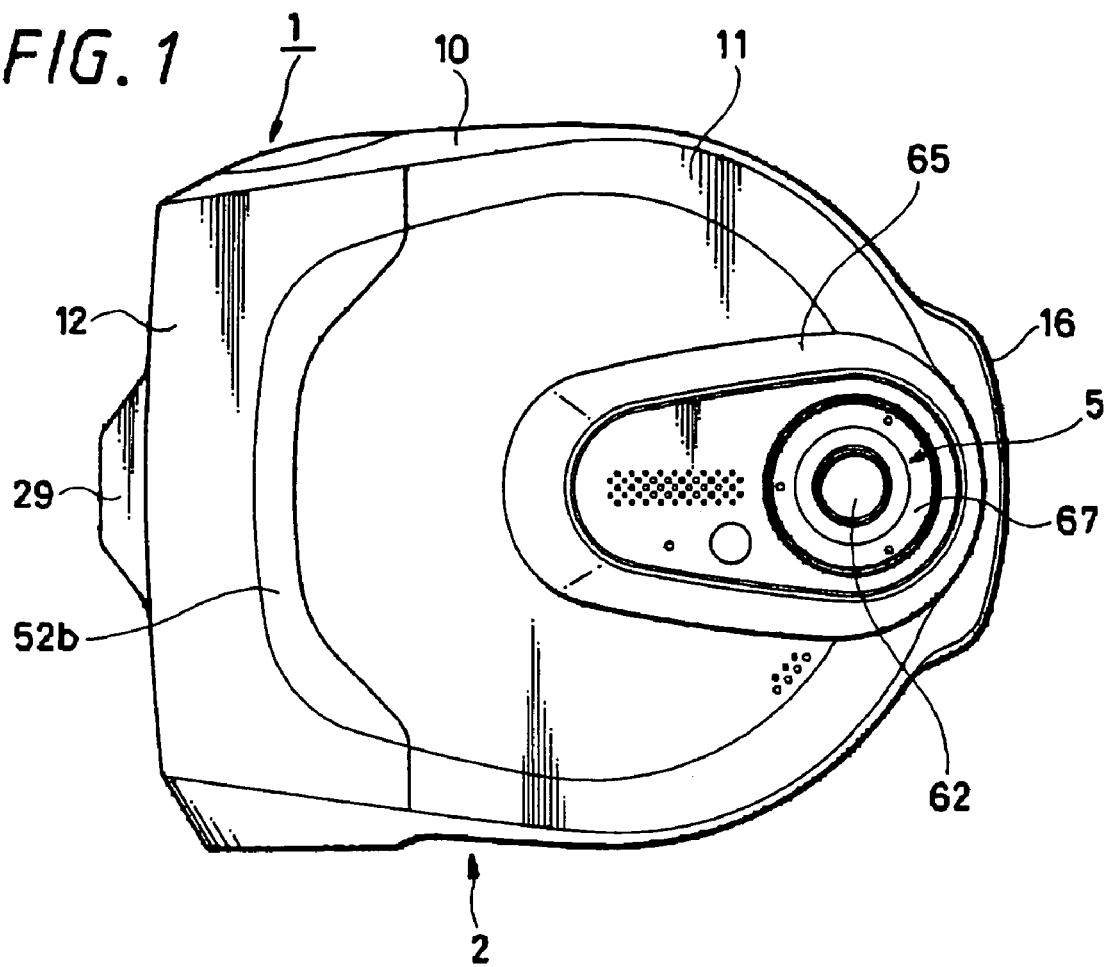
FIG. 1 is a front view showing a disc type waterproof camera apparatus of a waterproof electronic device according to a first embodiment of the present invention.
Figure 2:
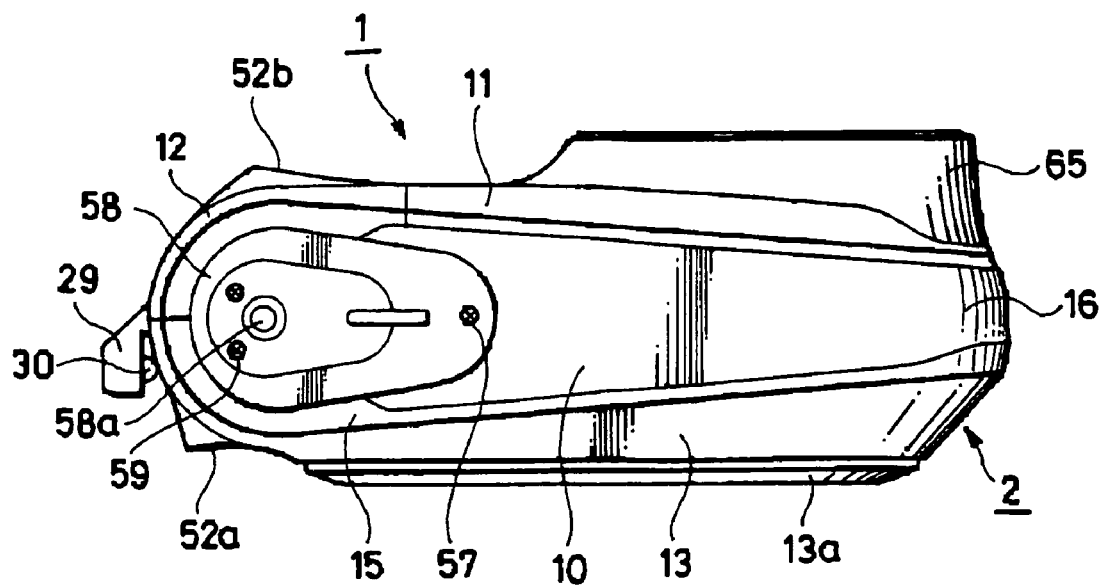
FIG. 2 is a bottom view of the disc type waterproof camera apparatus shown in FIG. 1.
Figure 3:
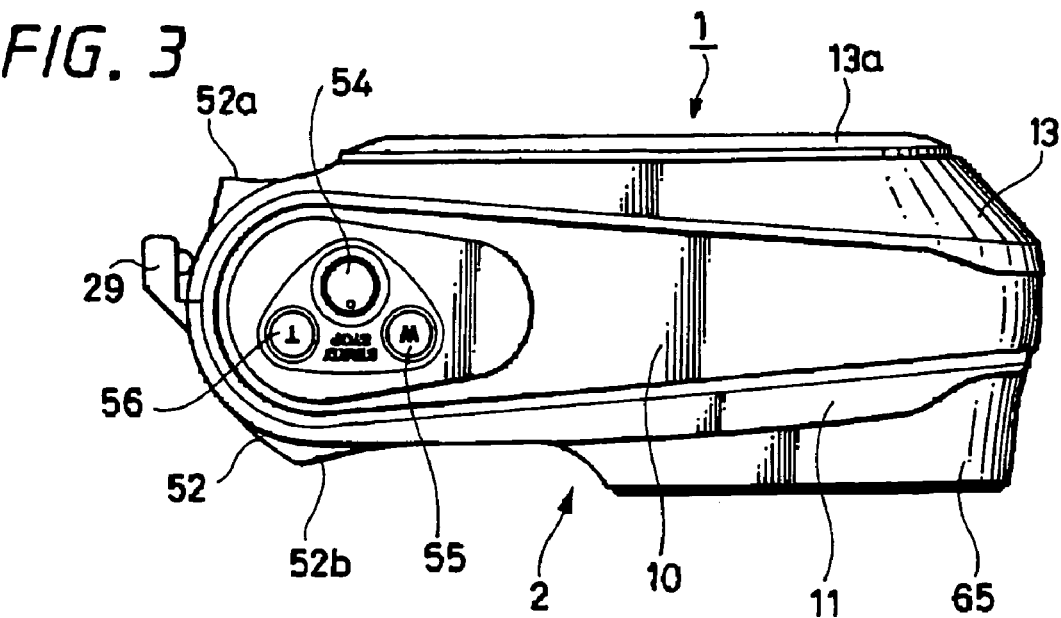
FIG. 3 is a plan view of the disc type waterproof camera apparatus shown in FIG. 1.
Figure 4:
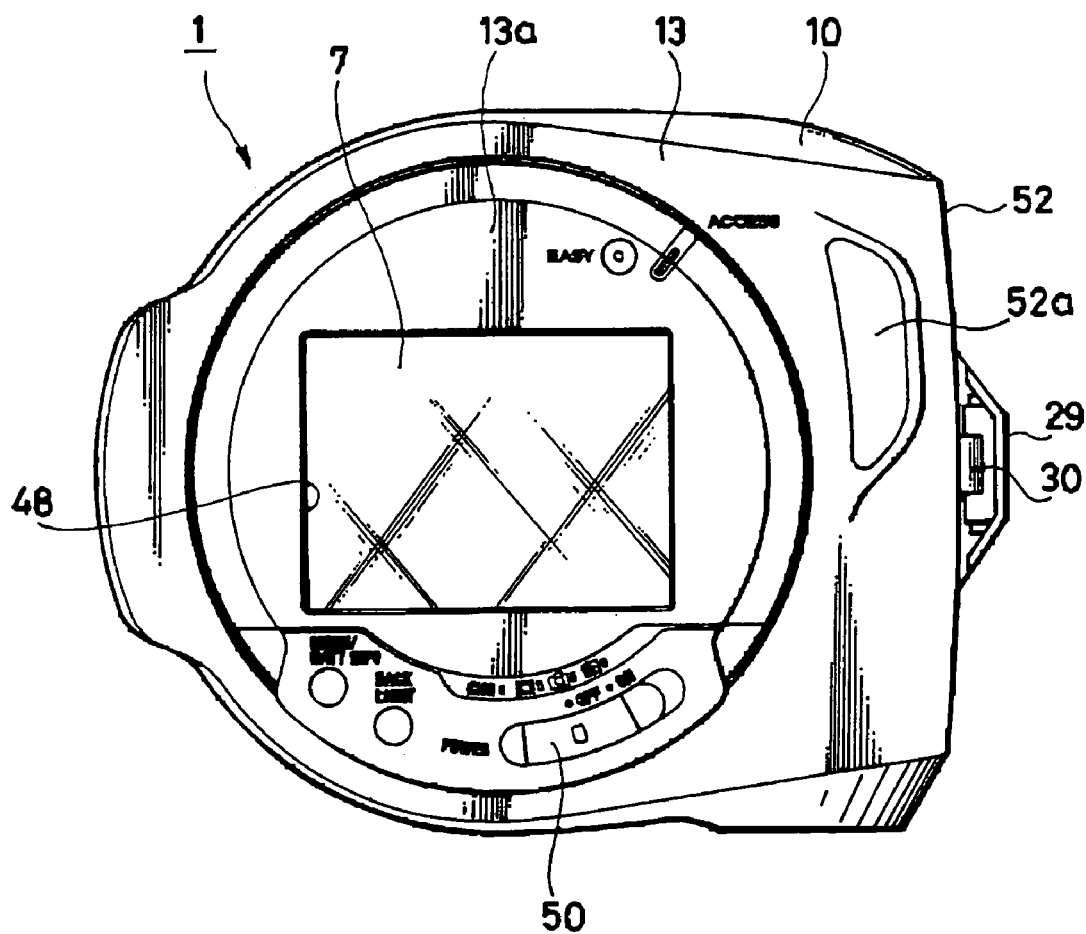
FIG. 4 is a rear view of the disc type waterproof camera apparatus shown in FIG. 1.
Figure 5:
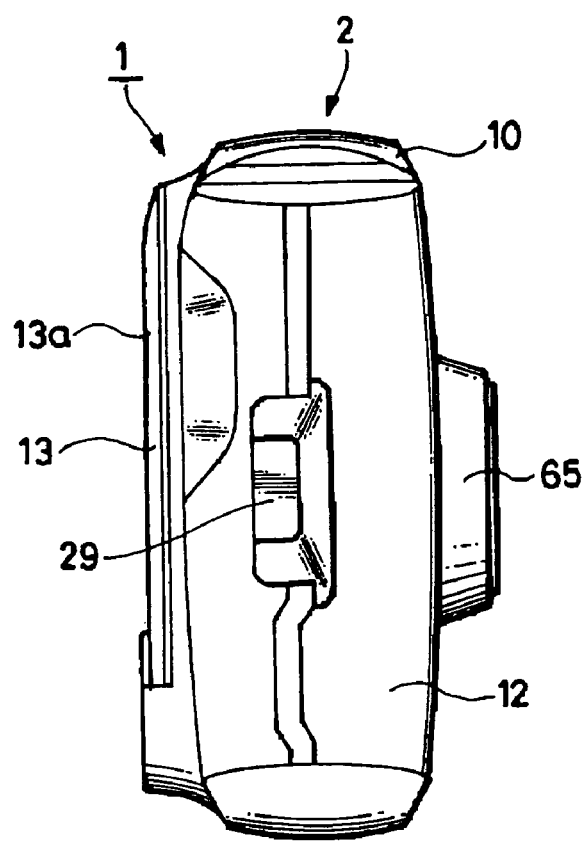
FIG. 5 is a left-hand side elevational view of the disc type waterproof camera apparatus shown in FIG. 1.
Figure 6:
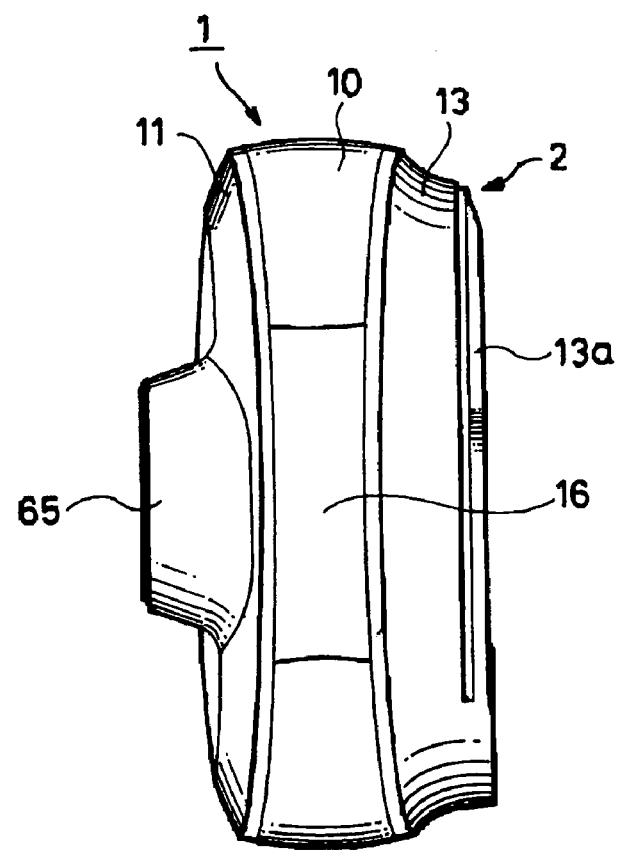
FIG. 6 is a right-hand side elevational view of the disc type waterproof camera apparatus shown in FIG. 1.
Figure 7:
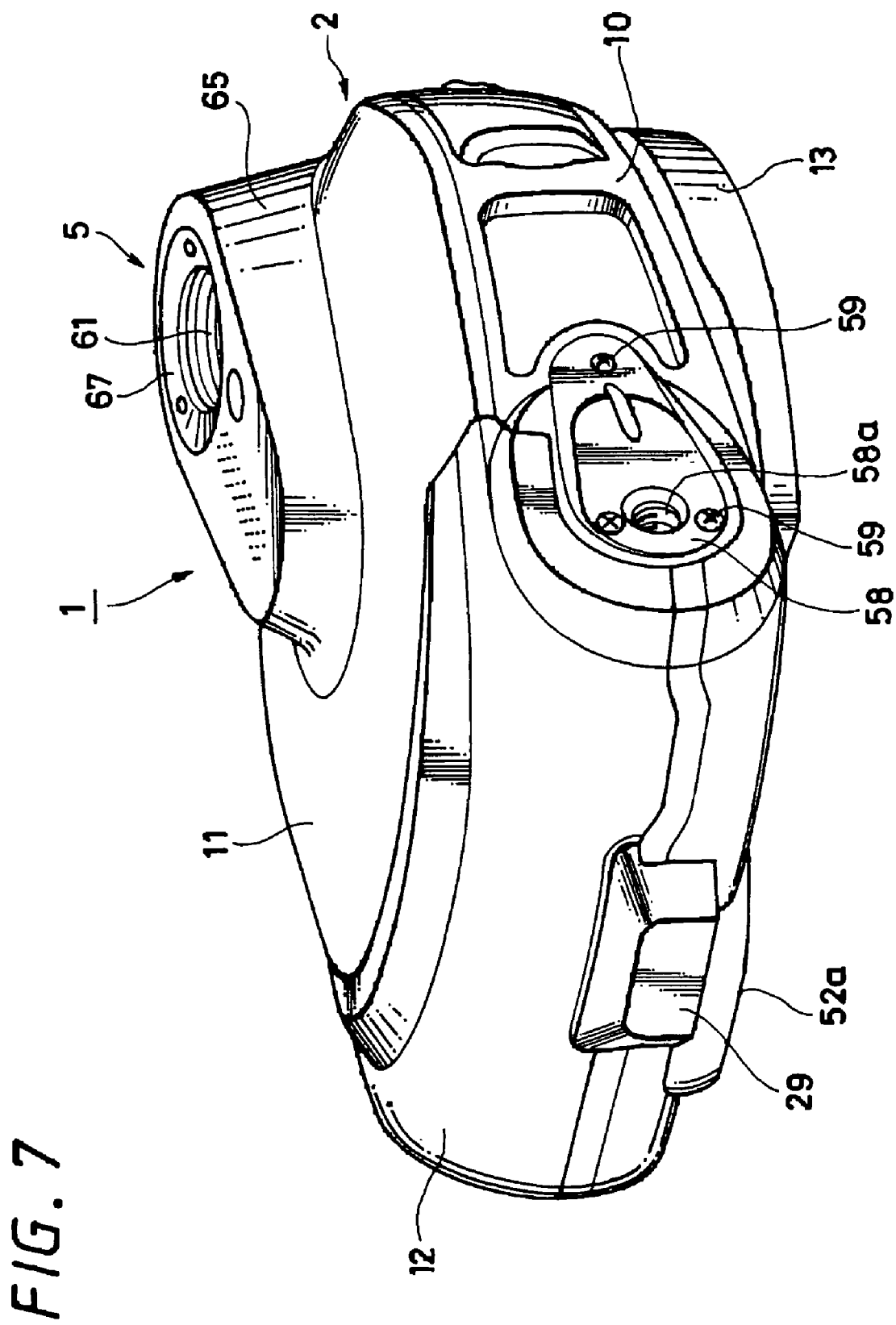
FIG. 7 is a perspective view of an outside appearance showing the disc type waterproof camera apparatus shown in FIG. 1 from the side of the lens-side outer case body.

FIGS. 1 to 19 show the embodiments of the present invention. Specifically, FIGS. 1 to 7 show a disc type waterproof camera apparatus of a waterproof type electronic device according to a first embodiment of the present invention. That is, FIG. 1 is a front view; FIG. 2 is a bottom view; FIG. 3 is a plan view; FIG. 4 is a rear view; FIG. 5 is a left-hand side elevational view; FIG. 6 is a right-hand side elevational view; and FIG. 7 is a perspective view of an outside appearance.

Figure 8:
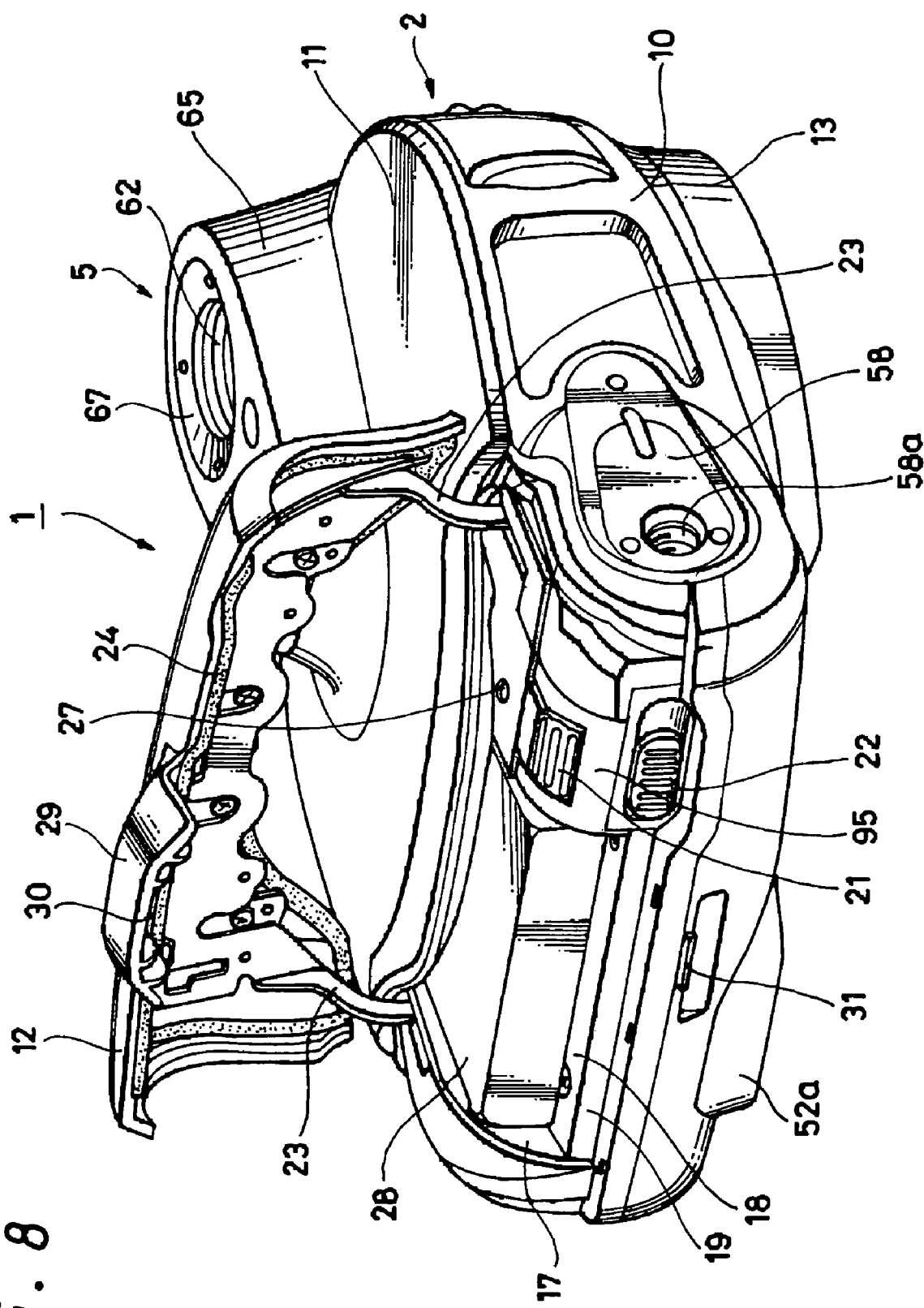
FIG. 8 is a perspective view of an outside appearance showing the disc type waterproof camera apparatus shown in FIG. 1 from the side of the lens-side outer case body with a buckle being opened.
Figure 9:
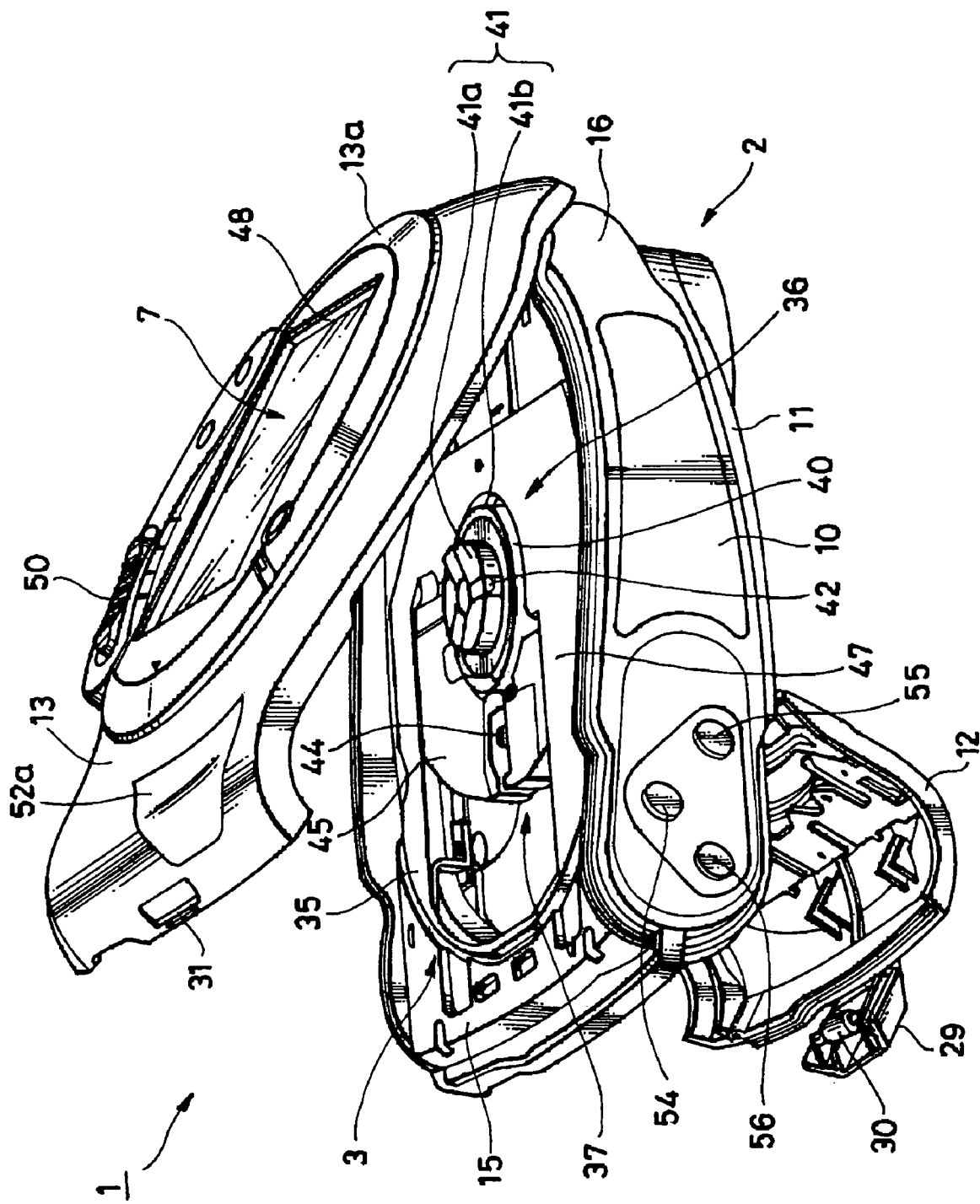
FIG. 9 is a perspective view showing the disc type waterproof camera apparatus shown in FIG. 1 from the side of the lens-side outer case body with a disc lid and the buckle being opened.
Figure 10:
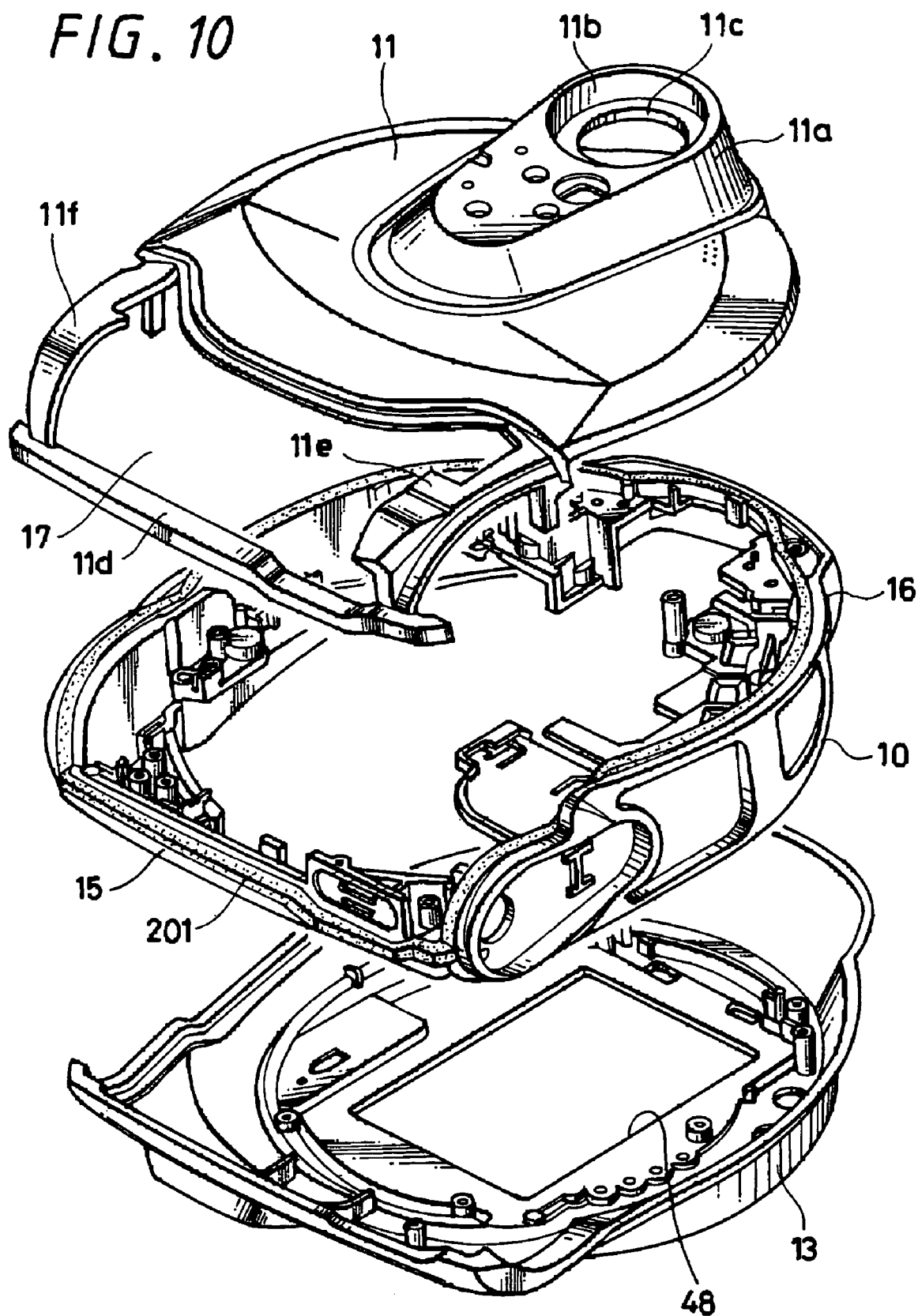
FIG. 10 is a perspective view showing a center frame body, the lens-side outer case body and the disc lid of the camera apparatus body of the disc type waterproof camera apparatus shown in FIG. 1 in an exploded fashion.

FIG. 8 is a perspective view showing a disc type waterproof camera apparatus according to the present invention from the front side with its buckle being opened. FIG. 9 is a perspective view showing the disc type waterproof camera apparatus according to the present invention from the disc lid side with its disc lid and buckle both being opened. FIG. 10 is an exploded perspective view showing a center frame body, a lens-side outer case body and an electronic device body.

Figure 11:
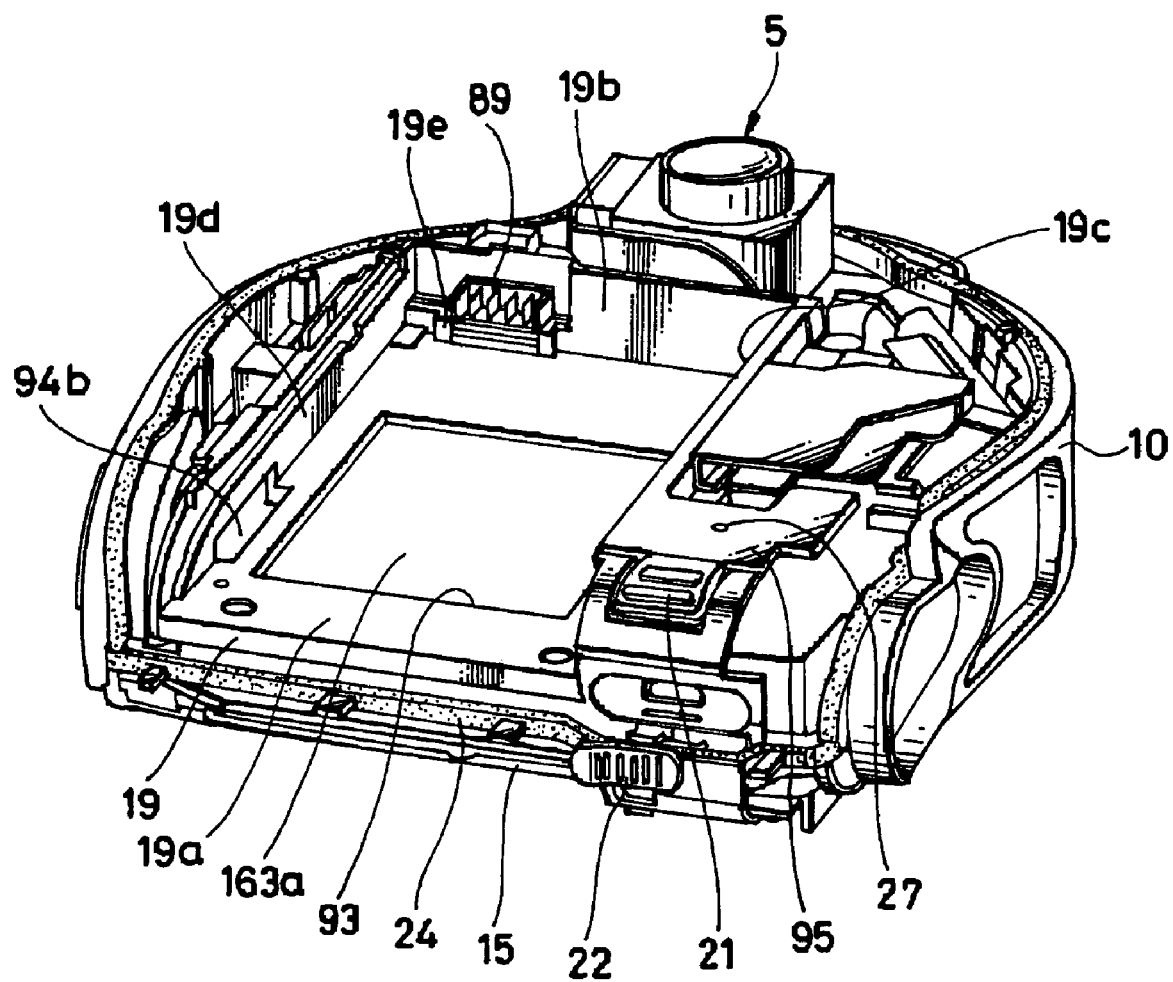
FIG. 11 is a perspective view showing the state in which a battery holder is attached to the center frame body of the disc type waterproof camera apparatus shown in FIG. 1.
Figure 12:
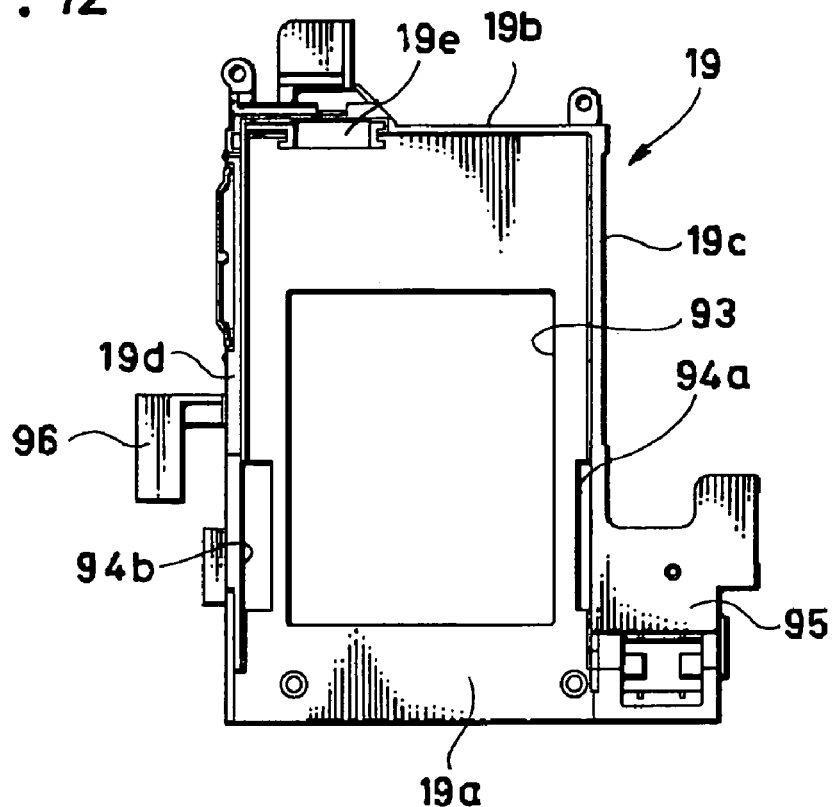
FIG. 12 is a plan view showing the battery holder of the disc type waterproof camera apparatus shown in FIG. 1.
Figure 13:
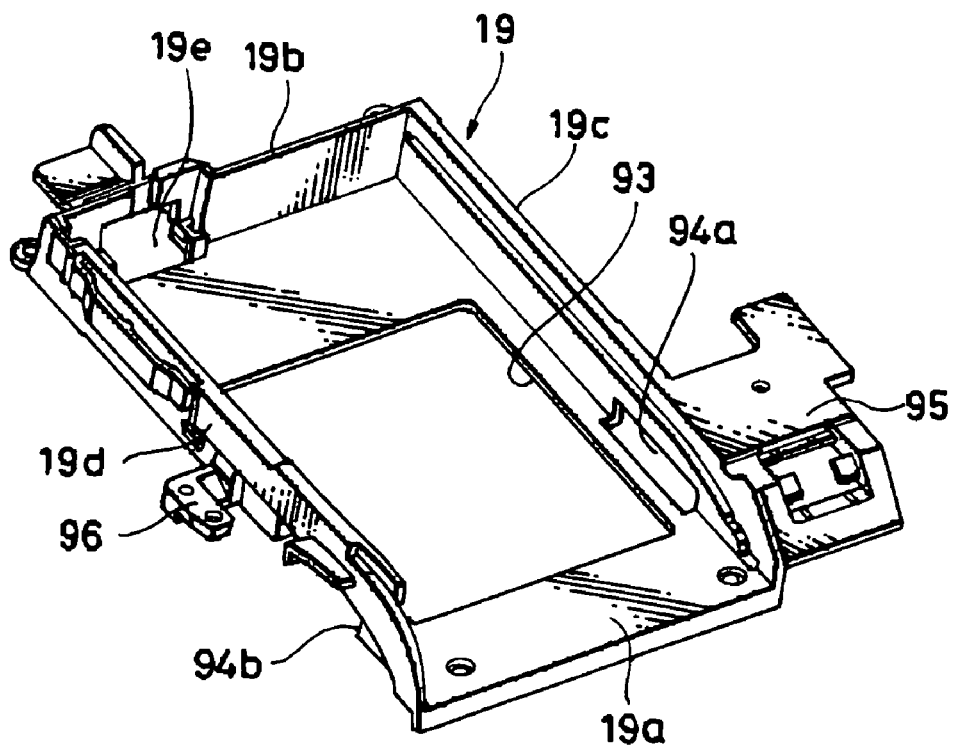
FIG. 13 is a perspective view showing the battery holder of the disc type waterproof camera apparatus shown in FIG. 1.
Figure 14:
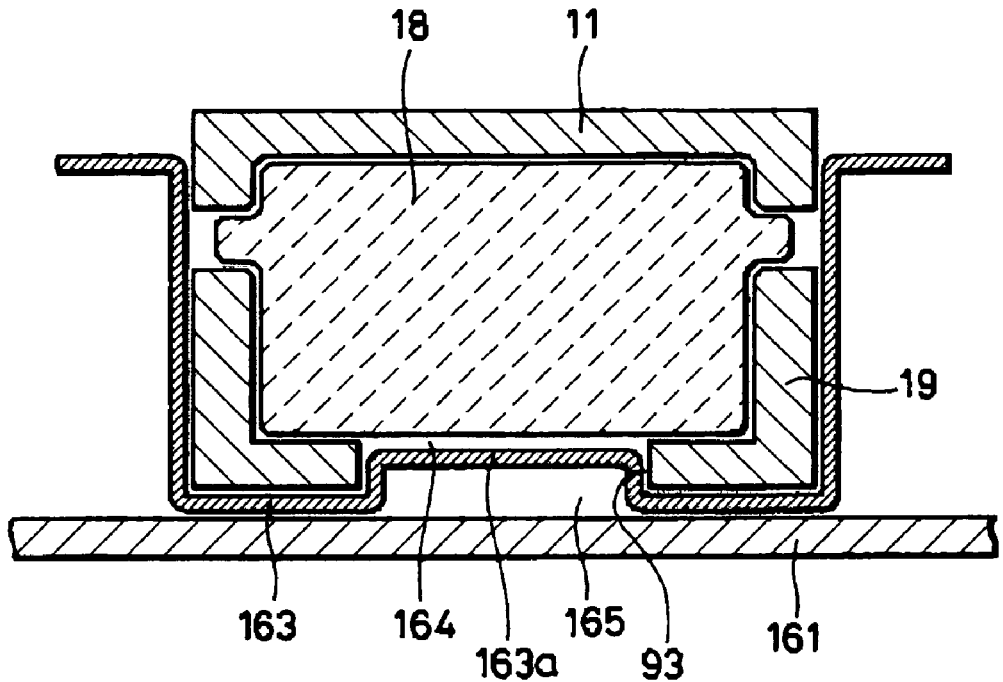
FIG. 14 is a cross-sectional view to which reference will be made in explaining a relationship among the battery holder, a battery and a printed circuit board of the disc type waterproof camera apparatus shown in FIG. 1.
Figure 15:
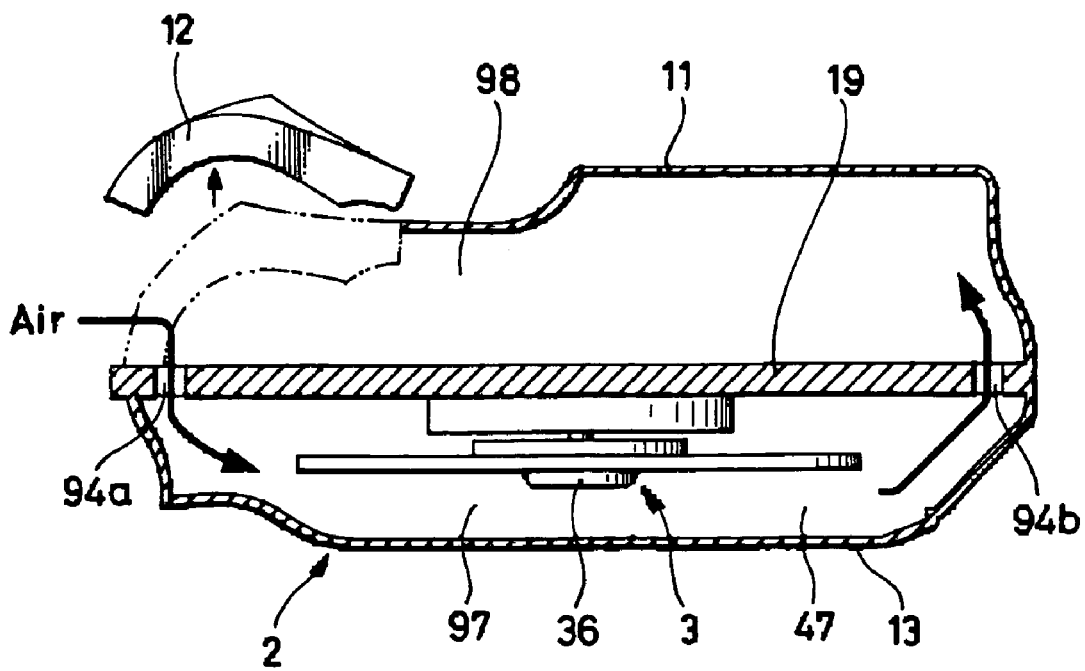
FIG. 15 is a cross-sectional view to which reference will be made in explaining a schematic arrangement of the inside structure of the disc type waterproof camera apparatus shown in FIG. 1.
Figure 16:
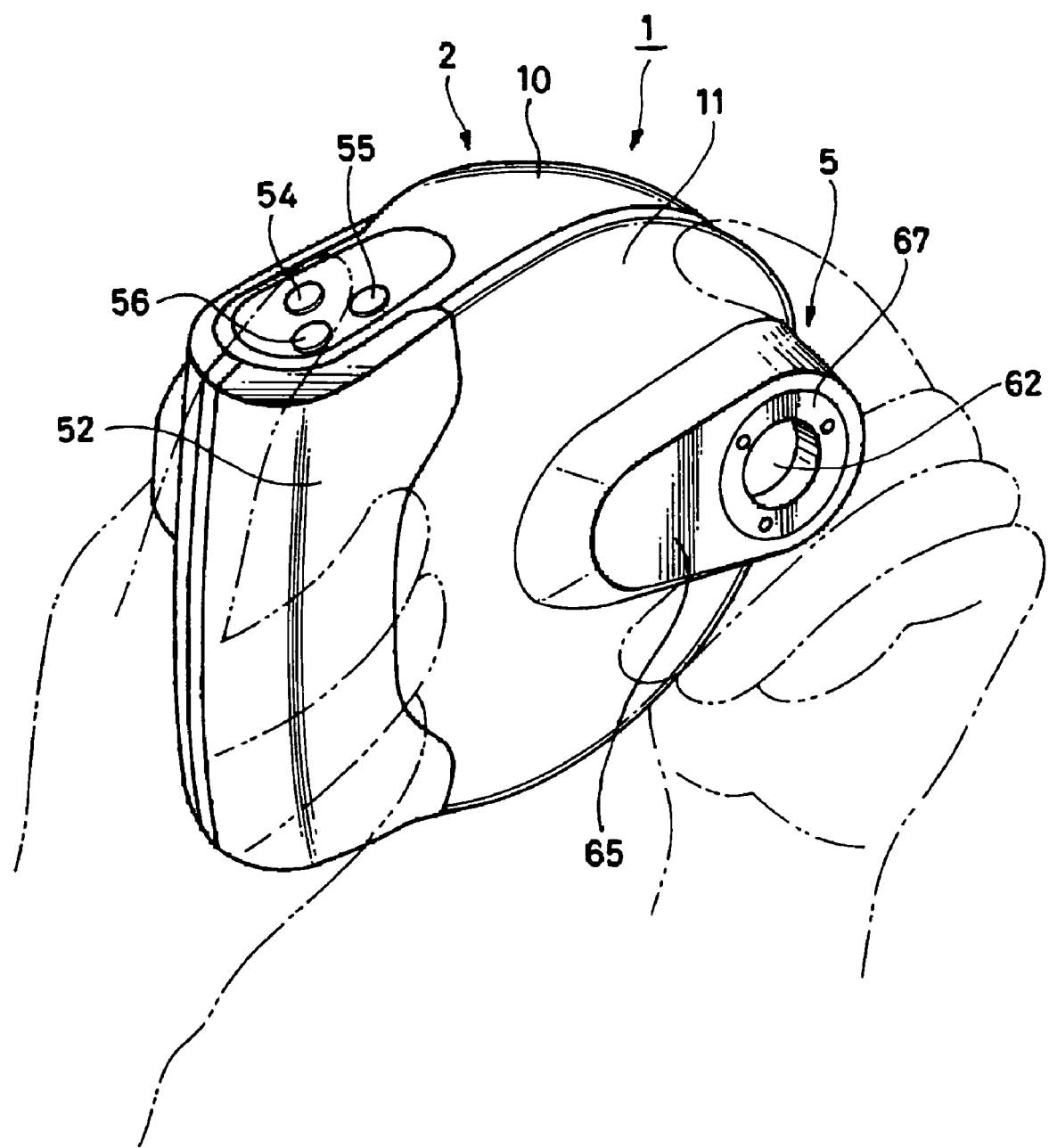
FIG. 16 is an explanatory diagram showing the state in which a user handles the disc type waterproof camera apparatus shown in FIG. 1.
Figure 17:
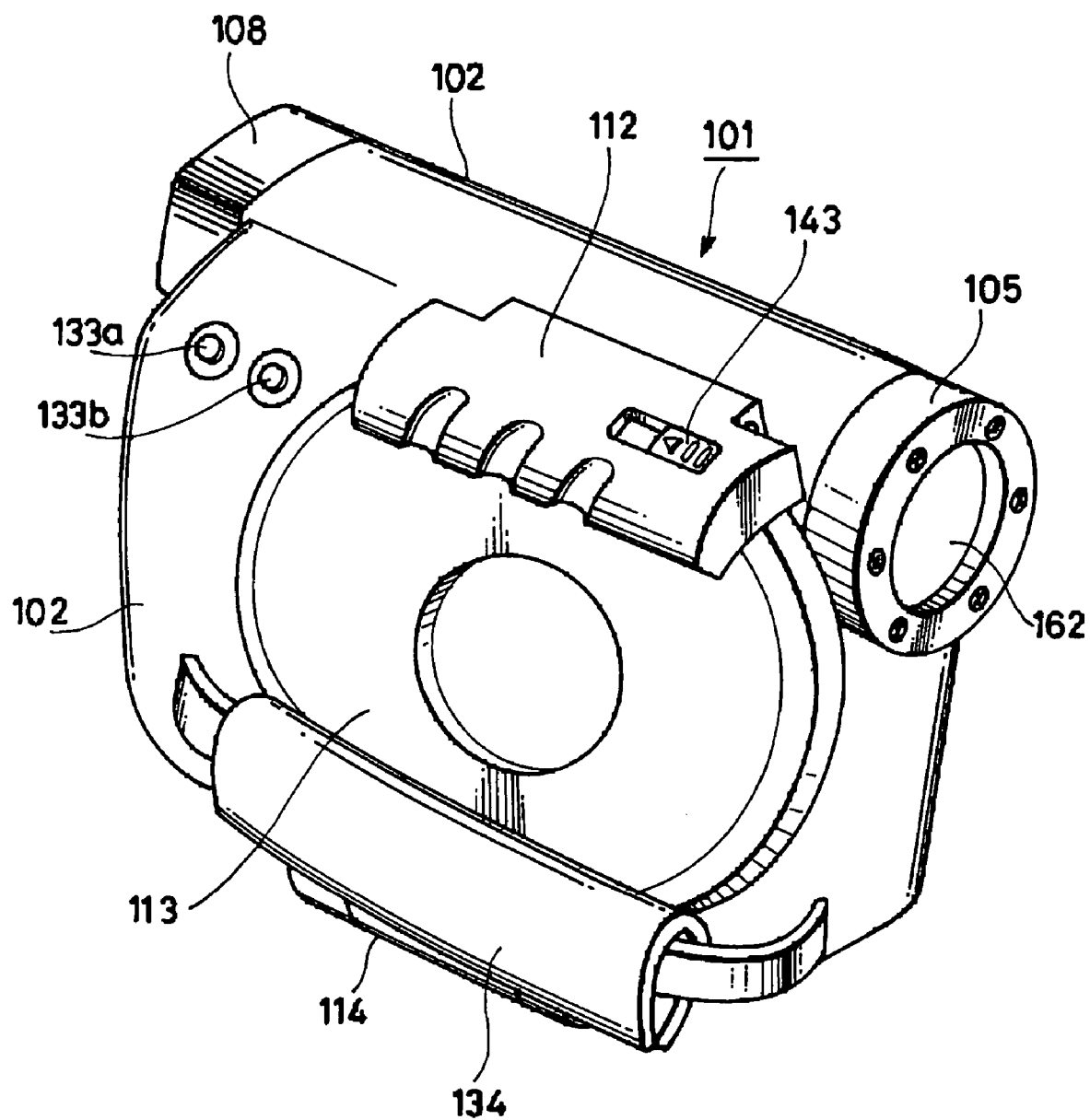
FIG. 17 is a perspective view showing a disc type waterproof camera apparatus of a waterproof electronic device according to a second embodiment of the present invention.
Figure 18:
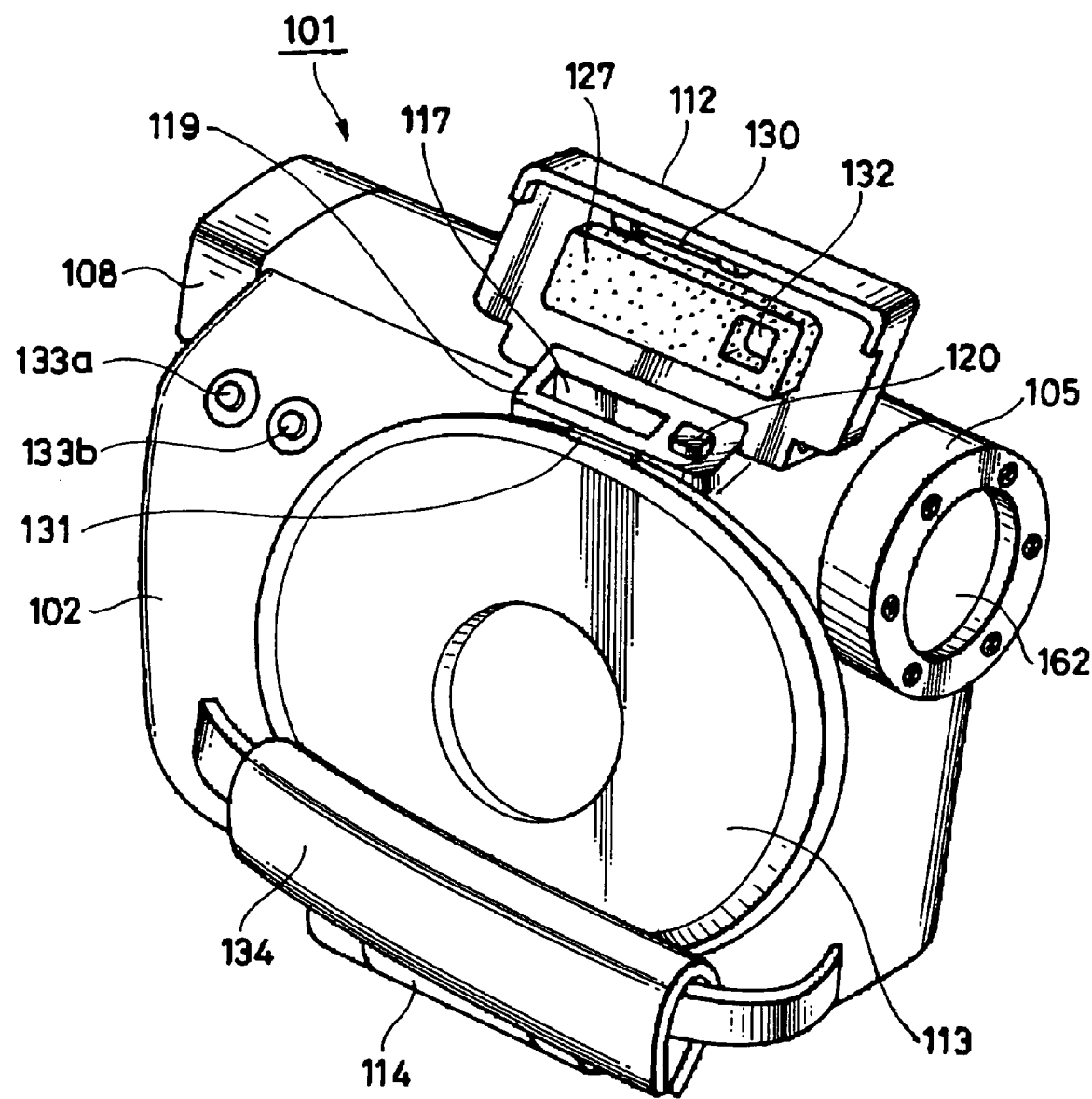
FIG. 18 is a perspective view showing the disc type waterproof camera apparatus shown in FIG. 17 with a buckle being opened.
Figure 19:
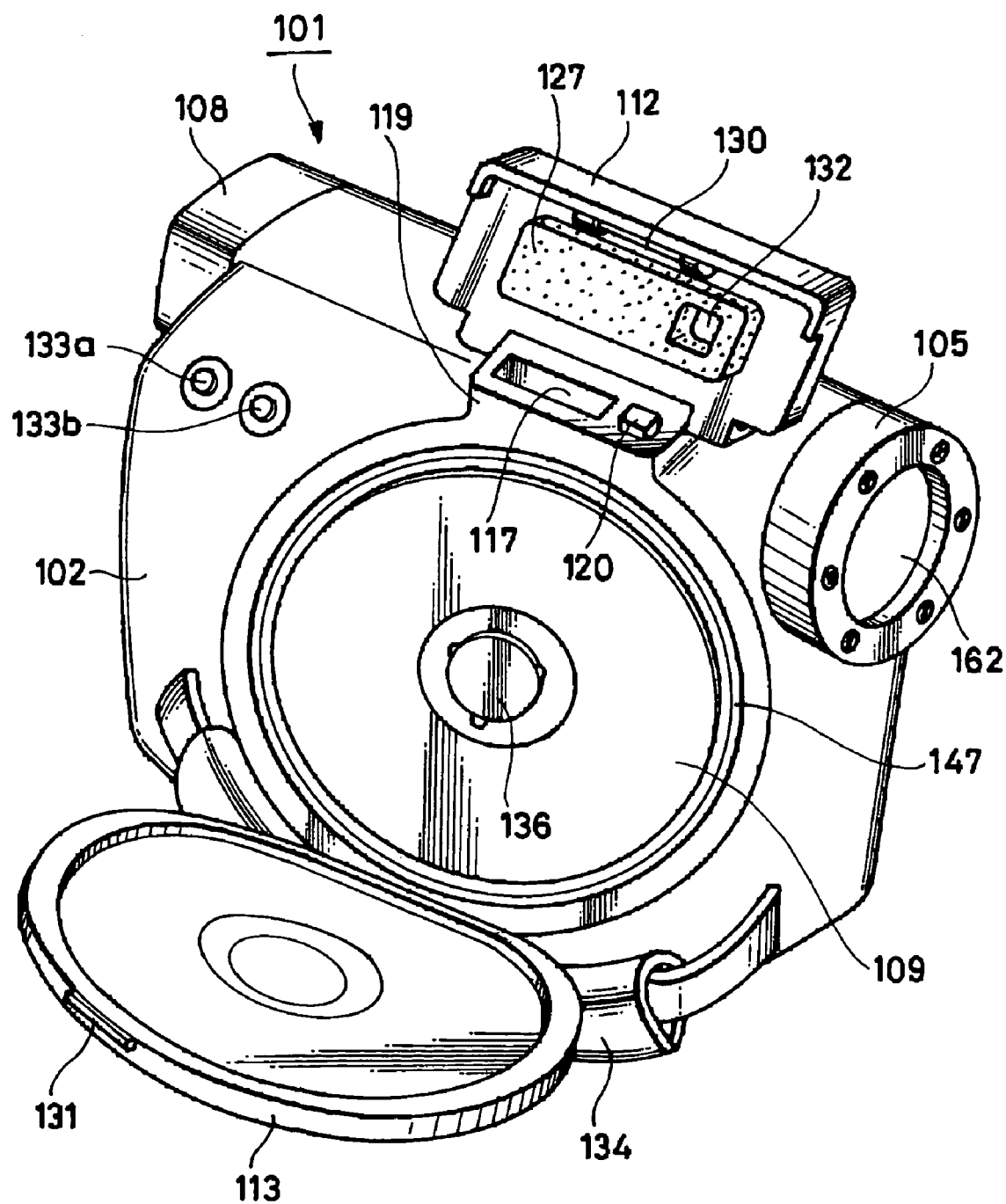
FIG. 19 is a perspective view showing the disc type waterproof camera apparatus shown in FIG. 18 with a lid being opened.

FIG. 11 is a perspective view showing the disc type waterproof camera apparatus according to the present invention in the state in which a battery holder is attached to the center frame body; FIG. 12 is a plan view of the battery holder; FIG. 13 is a perspective view of the battery holder; FIG. 14 is a cross-sectional view of a battery compartment portion; FIG. 15 is a schematic explanatory diagram showing the central portion of the disc type waterproof camera apparatus in a cross-sectional fashion; FIG. 16 is an explanatory diagram showing the state in which the disc type waterproof camera apparatus is in use; FIG. 17 is a perspective view showing a disc type waterproof camera apparatus of a waterproof type electronic device according to a second embodiment of the present invention; FIG. 18 is a perspective view showing the disc type waterproof camera apparatus in the state in which a buckle is opened; and FIG. 19 is a perspective view showing the disc type waterproof camera apparatus in the state in which the disc lid is opened.

A disc type waterproof camera apparatus 1 shown in FIGS. 1 to 9 is a camera apparatus (hereinafter referred to as a "disc type camera apparatus") which uses a DVD-R (Digital Versatile Disc-Recordable), which shows a specific example of a disc-like recording medium, as information storage media and converts an optical image into an electric signal by a CCD (charge-coupled device), that is, solid-state image pickup device so that the thus converted electric signal may be recorded on a DVD-R or that the thus converted electric signal may be displayed on a display apparatus formed of a suitable flat surface monitor such as an LCD (liquid-crystal display). However, the information storage media according to the waterproof camera apparatus of the present invention is not limited to the DVD-R. As the information storage media, there can be used other recordable optical discs such as a DVD-RW (Digital Versatile Disc Rewritable), disc-like recording mediums of other recording systems such as a magneto-optical disc and a magnetic disc and recording mediums of other forms such as a magnetic tape and a semiconductor recording medium.

As shown in FIGS. 1 to 9, this disc waterproof camera apparatus 1 is composed of a camera apparatus body 2, which shows a specific example of an electronic device body to which a plurality of openable and closable lid can be attached, a disc drive apparatus 3 for rotating a DVD-R, detachably attached thereto, to record (write) and reproduce (read) an information signal, a control apparatus (not shown) including a control circuit and the like to control driving of this disc drive apparatus, a lens apparatus 5 for introducing an image of an object into a CCD (charge-coupled device) serving as an image pickup means, a touch panel apparatus 7 including a flat surface monitor composed of a display apparatus such as a liquid-crystal display for displaying a picture based on a video signal outputted from the CCD, a storage device (not shown) for temporarily storing therein a video signal outputted from the CCD and the like. These disc drive apparatus 3, lens apparatus 5 and touch-panel apparatus 7 and the like are all housed within the camera apparatus main body 2.

As shown in FIGS. 1 to 9, the camera apparatus main body 2 is composed of a center frame body 10 located at the central portion, a lens-side outer case body 11 for covering one surface side of this center frame body 10 and a buckle 12 for covering an opening portion 17 formed on this lens-side outer case body 11 so that the opening portion 17 can be opened and closed. This center frame body 10 has a disc loading portion 47 formed at its side opposite to the lens-side outer case body 11 and a disc-like recording medium is detachably loaded onto the disc loading portion 47. The disc loading portion 47 is covered with a disc lid 13, which shows a specific example of a lid, rotatably attached to the center frame body 10 so that the disc loading portion 47 can be opened and closed.

The center frame body 10 has substantially a horseshoe-shaped flat surface and it is composed of a curved frame portion 16 of substantially U-like shape and a horizontal crosspiece portion 15 for joining the opening side of the curved frame portion 16 in substantially straight-line fashion. Although this center frame body 10 is high enough to house therein the disc drive apparatus 3 and the like, it is shaped so as to have an incline such that the side of the horizontal crosspiece portion 15 is set to be high and that the height of the curved frame portion 16 of the opposite side is progressively decreased in the center thereof. The disc drive apparatus 3, the control apparatus and other apparatus and devices are located within this center frame body 10. This center frame body 10 has the lens-side outer case body 11 secured on its surface opposite to the side of the disc lid 13 by a plurality of fixing screws.

The lens-side outer case body 11 has on its horizontal crosspiece portion 15 side provided a front frame portion 11d extended in the lateral direction and left and right lateral frame portions 11e, 11f extended in the front and back direction, whereby the opening portion 17 is largely opened. When the lens-side outer case body 11 is assembled, the front frame portion 11d is superposed on the horizontal crosspiece portion 15 of the center frame body 10, the left and right lateral frame portions 11e, 11f are superposed on the horizontal crosspiece portion 15 side of the curved frame portion 16 and the opening portion 17 is opened on the side of the horizontal crosspiece portion 15 of the center frame body 10. This opening portion 17 can be freely opened and closed by a buckle 12 and the buckle 12 is rotatably supported by a pair of hinge arms 23, 23 rotatably supported to the center frame body 10.

Based on rotation operations of the pair of hinge arms 23, 23, the buckle 12 can stop at the closed position shown in FIG. 7 and the opened position shown in FIG. 8 or the buckle 12 can be stopped at arbitrary position between the closed position and the opened position. A sealing member 24 is attached to the whole periphery of the outer peripheral edge of the inner surface of the buckle 12. This sealing member 24 is adapted to maintain airtight property between the buckle 12 and the camera apparatus body 2 to thereby realize a waterproof (or water-resistant) structure in the inside of the buckle 12. The sealing member 24 may be formed as one body with the buckle 12 by a dichromatic molding, for example. Alternatively, a string-like sealing member may be unitarily fixed to the buckle 12 by an adhesive.

This buckle 12 has not only a function as a lid to open and close the opening portion 17 including the battery compartment portion 18 but also a function as a fastening means for strongly fastening the disc lid 13 to the closed position. To this end, a fastening means 29 having a roller 30 rotatably supported thereon is provided at substantially the central portion of the tip end side of the buckle 12. Concurrently therewith, an engagement protrusion 31 with which a roller 20 is detachably engaged is provided at substantially the central portion of the tip end side of the disc lid 13. By engaging the fastening means 29 into this engagement protrusion 31 through the roller 30, the disc lid 13 can be held at the position at which the disc lid 13 is strongly fastened and closed by the buckle 12.

This fastening operation and the opposite operation are applied to the fastening means 29 and the roller 30 is rotated in the direction in which the fastening means 29 is disengaged from the engagement protrusion 31 and thereby the engagement state is released, whereby the buckle 12 can be opened to open the opening portion 17. The battery compartment portion 18 and the three operation means are located within this opening portion 17 and the battery compartment portion 18 and the three operation means can be closed or opened by the buckle 12. The three operation means are a recording stop switch 21 serving as the first operation means for stopping the recording means from recording the disc-like recording medium, a slide lever 22 serving as the second operation means and a restart switch 27 for restarting a disc type waterproof camera apparatus which was de-energized by some trouble.

Thus, when the buckle 12 is located at the closed position shown in FIG. 7, since the opening portion 17 is closed by the buckle 12, the battery compartment portion 18 and the three operation means are all hidden with the buckle 12. In addition, since the sealing member 24 provided at the outer peripheral edge of the inner surface of the buckle 12 is closely contacted with the whole periphery of the lens-side outer case body 11 in an airtight fashion, it is possible to prevent dusts and smudges from entering from the contact portion into the camera apparatus body 2 and also it is possible to reliably prevent liquid such as water and moisture from entering the camera apparatus body 2.

When on the other hand the buckle 12 is located at the opened position shown in FIG. 8, the battery compartment portion 18, the recording stop button 21 and the lever 22 and the restart switch 27 are exposed, respectively. For this reason, in the state in which the buckle 12 is opened, a battery 28 which shows a specific example of the power supply can be unloaded from the battery compartment portion 18 and a new battery 28 can be loaded into the battery compartment portion 18. Also, since the recording stop button 21, the slide lever 22 and the restart switch 27 can be operated only when the buckle 12 is placed in the opened position, it is possible to prevent the occurrence of troubles in which the user makes an error to operate the slide lever 22 before the buckle 12 is opened and in which the disc lid 13 is inadvertently opened before the buckle 12 is opened so that necessary information is not recorded on the information recording medium.

The battery compartment portion 18 is composed of a battery holder 19 shown in FIGS. 12 and 13. The battery holder 19 is formed of a rectangular casing which is opened both in the top surface and the front surface. The battery holder 19 consists of a bottom surface portion 19a, a back surface portion 19b and left and right surface portions 19c, 19d. A rectangular through-hole 93 is formed on the bottom surface portion 19a of the battery holder 19. Further, air holes 94a, 94b for ventilation are provided at corner portions at which the bottom surface portion 19a and the left and right surface portions 19c, 19d cross each other. Then, the back surface portion 19b has a terminal portion 19e formed thereon. A body-side connection terminal 89 (see FIG. 11) connected to the terminal portion of the battery 28 is attached to this terminal portion 19e.

Further, a switch holder 95 for holding the recording stop switch 21 is provided on the front portion of the left side surface portion 19c of the battery holder 19. Also, a sensor receiving portion 96, which projects toward the outside, is provided on the right side surface portion 19d of the battery holder 19. A moisture sensor (moisture sensor device), not shown, is attached to this sensor receiving portion 96. The battery compartment portion 18 is composed of the area of the battery holder 19 surrounded by the bottom surface portion 19a, the back surface portion 19b and the left and right side surface portions 19c, 19d.

The battery holder 19 having the above-mentioned arrangement is attached to the center frame body 10 in the state shown in FIG. 11. Specifically, the battery holder 19 is fastened to and fixed to the center frame body 10 in alignment with the horizontal crosspiece portion 15 of the center frame body 10 by a plurality of fixed screws. FIG. 14 is a cross-sectional view of the battery compartment portion 18 composed of the battery holder 19 taken along the direction in which the horizontal crosspiece portion 15 is extended and to which reference will be made in explaining a positional relationship between the battery holder 19 and a printed circuit board 161.

In general, when an electronic device is miniaturized, rise of temperature generated when the apparatus body is in use becomes a problem to be solved. Main factors of such rise of temperature is heat generated from a large printed circuit board on which many electronic devices are mounted in addition to heat generated from the battery itself. For this reason, if the battery and the large printed circuit board are located close to each other, then there is a problem in which their temperatures are increased, respectively. Therefore, since it is customary that the battery and the main printed circuit board should be isolated from each other with a certain distance, designing of electronic device is limited from a structure standpoint and hence it has been difficult to miniaturize the electronic device.

The above-mentioned problem can be solved by the structure shown in FIG. 14 without increasing the apparatus in size. Specifically, a thin metal radiation plate with high heat conduction (for example, aluminum alloy plate, stainless steel plate, etc.) is located between the printed circuit board 161 which generates much heat and the battery 18. The thin metal radiation plate 163 is located relative to the printed circuit board 161, the battery holder 19 is located on the radiation plate 163 and the battery 18 is accommodated in the battery holder 19.

At that time, a part of the battery holder 19 is formed as a cavity portion (through-hole 93), and a radiation portion 163a is provided on the radiation plate 163 such that the printed circuit board 161 may be located on the lower portion of the through-hole 93 which is the cavity portion. Upper and lower space portions 164, 165 are formed by this radiation portion 163a, respectively. As described above, when the radiation portion 163a is provided on the radiation plate 163, the radiation portion 163a is inserted into the through-hole (cavity portion) 93 of the battery holder 19 and the space portions 164, 165 are formed above and below the radiation portion 163a, without transmitting heat from the printed circuit board 161, which generate much heat, to the battery 18 (that is, making it difficult to transmit heat from the printed circuit board 161 to the battery 18), it becomes possible to radiate heat through the radiation plate 163. As a result, it becomes possible to locate the printed circuit board 161 and the battery 18 in the inside of the electronic device efficiently.

FIG. 15 is a diagram showing a schematic arrangement of the inside structure of the waterproof type electronic device. As shown in FIG. 15, the battery holder 19 shows a specific example of a partition member which divides the inside space of the camera apparatus body 2 into a first chamber 97 including a disc loading portion 47 and a second chamber 98 including an opening portion 17 which is hermetically closed by the buckle 12. The first and second chambers 97 and 98 are communicated with each other by air holes 94a, 94b at left and right sides of the battery holder 19 and the air is circulated between the first and second chambers 97 and 98 through these air holes 94a, 94b.

As shown in FIG. 9, the disc drive apparatus 3 is composed of a mechanical deck 35, a table rotating apparatus 36, an optical pickup apparatus 37, a pickup moving apparatus and the like. The mechanical deck 35 is formed of a frame-like member of substantially the same size as the DVD-R and it is resiliently supported to the center frame body 10 through a plurality of mount members, not shown. This mechanical deck 35 has the table rotating apparatus 36 mounted at its position displaced in one direction from the center. The table rotating apparatus 36 is composed of a spindle motor 40 fixed to the mechanical deck 35, a turntable 41 fixed to the rotary portion of this spindle motor 40 and the like.

The turntable 41 is composed of a disc engagement portion 41a with which the central hole of the DVD-R is fitted and a disc loading portion 41b on which the peripheral edge portion of the center hole is loaded. Further, the engagement portion 41a includes a plurality of clamp pawls 42 (three clamp pawls in this embodiment) provided along the circumferential direction with an equal interval and these clamp pawls 42 are engaged with the peripheral edge portion of the center hole of the DVD-R to thereby hold the DVD-R. The clamp pawls 42 are spring-biased in the outside of the radius direction by coil springs, respectively. The DVD-R is centered at the center of the turntable 41 and held at constant holding force by holding force of the clamp pawls 42 under spring forces of the coil springs. By moving the clamp pawls 42 in the backward against the spring force of the coil spring, it becomes possible to load the DVD-R onto the turntable 41 and to unload the DVD-R from the turntable 41.

The optical pickup apparatus 37 is composed of a biaxial actuator including a pickup lens 44 opposed to the information recording surface of the DVD-R, a slide member 45 having this biaxial actuator mounted thereon and the like. The slide member 45 can be freely reciprocated by the pickup moving apparatus, not shown and it can become close to and come away from the turntable 41. The pickup moving apparatus is composed of two guide shaft located parallel to each other, a feed screw shaft provided in parallel to these guide shafts, a feed motor for rotating this feed screw shaft and the like.

The two guide shafts of the pickup moving apparatus are extended in the front and back direction of the disc type camera apparatus 1 across the spindle motor 40. The slide member 45 is slidably held on the two guide shafts and a nut member attached to the slide member 45 is engaged with the screw portion of the feed screw shaft. Thus, when the feed motor of the pickup moving apparatus is rotated, the optical pickup apparatus 37 can be selectively moved in the direction in which it becomes close to the turntable 41 and in the direction in which it comes away from the turntable 41 in response to the rotating direction of the feed screw shaft.

The disc drive apparatus 3 having the above-mentioned arrangement is attached to the center frame body 10 in the state in which the turntable 41 is located on the side of the disc lid 13. The disc loading portion 47 on which the disc-like recording medium such as the DVD-R is detachably loaded is set on the side of the turntable 41 of this disc drive apparatus 3. Further, a space portion for use with a lens apparatus is set in the inner part within the camera apparatus body 2 and the lens apparatus 5 is disposed within the space portion.

As shown in FIGS. 4 and 9, a circularly-projected thick portion 13a is provided on the disc lid 13. This thick portion 13a is of the size corresponding to the size of a disc-like recording medium (for example, DVD-R having a diameter of 8 cm, etc.) loaded on the turntable 41. A rectangular opening window 48 is set substantially at the central portion of the thick portion 13a of this disc lid 13. A touch panel apparatus 7 including a display means is attached to the opening window 48.

The touch panel apparatus 7 includes a touch panel, a display panel, a backlight panel, a holder, a pressing plate and the like. The display panel is bonded to one surface of the touch panel by adhesive and the backlight panel is disposed on the other surface of the display panel. The display panel and the backlight panel are surrounded by a spacer formed of a square frame body and this spacer is sandwiched by the touch panel and the backlight panel, whereby the touch panel apparatus 7 forming one assembly body on the whole is constructed. A flat surface monitor such as a liquid crystal display (LCD) and an EL (Electroluminescence) panel are suitable as the application to the display panel.

Further, a change-over switch 50 for turning the power supply ON and OFF and the like are disposed on the lower portion of the touch panel apparatus 7 of the thick portion 13a of the disc lid 13. The change-over switch 50 can be slid in an arc fashion and it can be depressed at predetermined position. Specifically, when the change-over switch 50 is slid, the power supply can be turned ON and OFF. Also, when the change-over switch 50 is depressed at the position in which the power supply is turned ON, shooting modes (for example, still picture shooting, motion shooting, playback display, etc.) can be switched. A first finger hook portion 52a constructing a part of a grip portion 52 to grip the camera apparatus body 2 is provided on the upper right portion outside the thick portion 13a of the disc lid 13. A thumb of right hand is contacted with this first finger hook portion 52a.

As shown in FIGS. 3 and 9, a recording button 54 for starting and ending shooting and a pair of zoom buttons are located at one end portion of the side of the horizontal crosspiece portion 15 in the curved frame portion 16 of the center frame body 10. The pair of zoom buttons is composed of a wide angle button 55 for moving the lens apparatus 5 to the wide angle (wide angle) side and a telephoto button 56 for moving the lens apparatus 5 to the telephoto (telephoto) side. When the wide angle button 55 or the telephoto button 56 is being continuously pressed within a predetermined range, a picture may be continuously enlarged or reduced. When the wide angle button 55 or the telephoto button 56 is placed at the end, the movement of the lens apparatus to the wide angle side or the telephoto side is stopped.

As shown in FIGS. 2 and 7, a tripod fixing metal fittings 58 for attaching this disc type waterproof camera apparatus 1 to a tripod (not shown) is buried into the other end portion of the side of the horizontal crosspiece portion 15 in the curved frame portion 16 of the center frame body 10. The tripod fixing metal fittings 58 can be detachably attached to the other end portion of the side of the crosspiece portion 15 by a plurality of fixed screws 59. The tripod fixing metal fittings 58 is formed of substantially an elliptic member with different radiuses of curvature of arc portions at both ends in the longitudinal direction and a screw hole 58a to which a tripod fixing screw is fitted is formed on the large-diameter side.

As shown in FIGS. 1, 7, 10 and so on, the lens apparatus 5 in which a camera lens 62 is exposed to the front is disposed on the end portion opposite to the buckle 12 of the lens-side outer case body 11 located on the front of the disc type waterproof camera apparatus 1. The lens-side outer case body 11 in which this lens apparatus 5 is located is provided with the lens thick portion 11a projected toward the front side and a lens cover 65 is attached to the lens thick portion 11a. A lens waterproof apparatus having a lens protective glass to protect the camera lens 62 is disposed within a concave portion 11b provided on the lens thick portion 11a.

The lens apparatus 5 is composed of a lens barrel formed of a combination of a plurality of cylindrical bodies and a lens unit formed of a combination of a plurality of lenses including the camera lens 62 held on this lens barrel. A CCD (charge-coupled device), that is, solid-state image pickup device, which shows a specific example of the image pickup means, is located behind the optical axis of the lens unit. The CCD is fixed to the lens barrel and the optical axis of the lens unit is set at substantially the central portion of its light-receiving surface. When objective light passed through the lens unit of this lens apparatus 5 is received by the CCD, a video signal composed of an electric signal corresponding to the object is outputted from the CCD to the control apparatus, the display apparatus and the like.

The lens cover 65 is of the shape corresponding to the lens thick portion 11a of the lens-side outer case body 11 and the through-hole lic is provided within the concave portion 11b. A fixing member 67 for fixing the lens protective glass is fitted into the through-hole 11c of the lens thick portion 11a. This lens cover 65 is detachably attached to the lens-side outer case body 11 by a plurality of fixing screws.

According to the disc type waterproof camera apparatus 1 having the above-mentioned arrangement, the sealing member 24 is attached to the whole periphery of the inner peripheral edge of the buckle 12. Thus, when the buckle 12 is closed, the buckle 12 is hermetically attached to the lens-side outer case body 11 through the sealing member 24. Therefore, the inside of the buckle 12 can be formed as the waterproof (water-resistant) structure by only closing the buckle 12. As a result, since the battery compartment portion 18, the recording stop switch 21, the slide lever 22 and the like need not be separately formed as the waterproof structures, the whole of the apparatus can be prevented from becoming large in size due to such waterproof structures and hence it is possible to provide an electronic device which is excellent in waterproof property (water-resistant property) although it is small in size.

Also, as shown in FIG. 7, when the buckle 12 is closed, the disc lid 13 is slightly pulled into the inside by the fastening means 29. That is, a backlash necessary for locking the disc lid 13 can be pulled into the inside by the buckle 12. Therefore, the disc lid 13 can be closely contacted with the center frame body 10, whereby the waterproof function of the disc lid can be made more stable.

At that time, when water enters the inside of the camera apparatus body 2 or humidity within the camera apparatus body 2 is increased remarkably so that moisture is produced within the camera apparatus body 2, the moisture state is detected by the moisture sensor. According to circumstances, RMD (Recording Management Data) or TOC (Table Of Contents) may not be written in the information recording medium. As a result, in this disc type waterproof camera apparatus 1, the disc lid 13 is locked so that the disc lid 13 is forced to be placed in the state in which it may not be opened. Since this state lasts until the moisture state within the camera apparatus body 2 is removed, in order to make the disc lid 13 become openable, it is necessary to remove the moisture state produced within the camera apparatus body 2.

In such a case, according to this embodiment, when the buckle 12 is opened, the first and second chambers 97 and 98 are connected with each other by the two air holes 94a, 94b formed on the battery holder 19. Therefore, the air flows into the camera apparatus body 2 through these air holes 94a, 94b and the air is circulated into the inside of the camera apparatus body 2 so that the inside of the camera apparatus body 2 can be dried, thereby making it possible to remove the moisture state within the camera apparatus body 2 quickly. In consequence, it is possible for the cameraman to comfortably shoot pictures with this disc type waterproof camera apparatus 1.

Further, since the air holes 94a and 94b are formed in the inside of the camera apparatus body 2, it is possible to prevent the inside temperature from rising by removing heat from a variety of heat sources provided within the camera apparatus body 2. In addition, since the air is circulated within the camera apparatus body 2, it is possible to prevent the moisture sensor and other assemblies within the camera apparatus body 2 from being deteriorated and consumed.

FIG. 16 is a perspective view showing an example of the state in which the disc type waterproof camera apparatus 1 according to this embodiment is in use. The cameraman holds the grip portion 52 of the camera apparatus body 2 with right hand and grips the portion near the lens apparatus 5 of the camera apparatus body 2 with left hand. Accordingly, as shown in FIGS. 1 to 3, a second finger hook portion 52b constructing a part of the grip portion 52 of the camera apparatus body 2 is provided at the end portion of the opposite side of the lens apparatus 5 of the lens-side outer case body 11.

The middle finger and the third finger of the right hand are contacted with the second finger hook portion 52b of the grip portion 52 of the disc type waterproof camera apparatus 1. The cameraman grips the grip portion 52 with the middle finger of the right hand and the like hooked to this second finger hook portion 52b and the thumb of the right hand hooked to the first finger hook portion 52a. Then, the cameraman turns the index finger of the right hand around above the camera apparatus body 2 to operate the three operation buttons 54 to 56 of the recording button 54, the wide angle button 55 and the telephoto button 56. In this manner, the cameraman can hold the disc type waterproof camera apparatus 1 and can take a picture of a desired object with a desired composition, a size and the like after the cameraman has operated the three operation buttons 54 to 56 with the index finger.

FIGS. 17 to 19 are perspective view showing a waterproof type camera apparatus of a waterproof type electronic device according to a second embodiment of the present invention. In a disc type waterproof camera apparatus 101 shown as the second embodiment, a disc lid 113 can be directly locked by a buckle 112 and an opening portion 117 also can be opened and closed at the same time. The camera apparatus body 102 is formed of a substantially square hollow housing. A lens apparatus 105 is located on the upper portion of the front side of the camera apparatus body 102 and a camera lens 162 is exposed to the front surface of the camera apparatus body 102. Then, a viewfinder 108 is located on the upper portion of the back side of the camera apparatus body 102.

As shown in FIG. 19, a disc drive apparatus 103 is located on one side surface of the camera apparatus body 102. The disc drive apparatus 103 is attached to the camera apparatus body 102 in such a state in which a rotary shaft of a table rotating apparatus 136 is directed in the horizontal direction. As a result, a DVD-R 109 loaded on the table rotating apparatus 136 is rotated in the vertical direction. A turntable of this table rotating apparatus 136 and a disc loading portion 147 which is the peripheral edge portion of the table rotating apparatus 136 can be freely opened and closed by the disc lid 113. The disc lid 113 is formed of a substantially circular flat member and it is rotatably attached to the lower portion of the camera apparatus body 102 by a hinge 114. Then, a buckle engagement protrusion 131 is provided at substantially the central portion of the free end side of the disc lid 113.

As shown in FIGS. 17 to 19, the buckle 112 is rotatably attached to a protruded portion 119 provided on the upper portion of the camera apparatus body 102. An opening portion 117 which is opened in the upper surface is provided on the protruded portion 119. The opening portion 117 is communicated with the inside of the camera apparatus body 102. When this opening portion 117 is opened, the air can be introduced into the inside of the camera apparatus body 102. Further, the protruded portion 119 has provided thereon a disc unloading switch 120 which shows a specific example of a recording medium unloading switch to enable the disc lid 113 to be opened. The disc unloading switch 120 shows a specific example of an important operation switch. The lock mechanism lasts to work until this disc unloading switch 120 is operated and hence the disc lid 113 may not be operated.

These opening portion 117 and disc unloading switch 120 can be hermetically sealed by the buckle 112. The buckle 112 is large enough to cover the upper surface of the protruded portion 119 and it is rotatably supported to the protruded portion 119 by pins. A packing made of a rubber-like resilient material is provided on the buckle 12 on its surface contacting with the upper surface of the protruded portion 119 as a sealing member which can hide the whole of the opening portion 117. Further, the packing 127 has formed thereon an escape hold 132 to escape the disc unloading switch 120.

A roller 130 for a fastening means is provided on the free end side of the buckle 112. When the buckle 112 is closed, the roller 130 is engaged with the engagement protrusion 131, whereby the disc lid 113 can be strongly fastened and fixed by the buckle 112. As shown in FIG. 17, the buckle 112 has on its surface provided a slide switch 143 by which the buckle 112 can be released from being locked and thereby opened. In FIGS. 17 to 19, reference numerals 133*a* and 133*b* denote operation buttons of the zoom switch. Also, reference numeral 134 denotes a grip belt by which the cameraman's hand to hold the disc type waterproof camera apparatus 101 can be held to thereby prevent the disc type waterproof camera apparatus 101 from being dropped.

The disc type waterproof camera apparatus 101 having the above-mentioned arrangement according to the second embodiment can achieve effects similar to those of the above-described embodiment. Specifically, since the sheet-like packing 127 is provided on the inner surface of the buckle 112, when the buckle 112 is closed, the buckle 112 can be firmly and strongly fastened to and fixed to the camera apparatus body 102 by the buckle mechanism so that the packing 127 can be closely attached to the whole of the upper surface of the protruded portion 119, thereby making the waterproof structure (or water-resistant structure) within the buckle 112 become more reliable.

Also, when the buckle 112 is opened, the opening portion 117 is opened before the disc lid 113 is opened so that the air is introduced into the camera apparatus body 102. Therefore, the thus introduced air is circulated within the camera apparatus body 102 to dry the inside of the camera apparatus body 102 so that the moisture state within the camera apparatus body 102 can be removed quickly. Also, it is possible to prevent the temperature within the camera apparatus body 102 from rising by removing heat generated from various heat sources placed within the camera apparatus body 102. Then, since the air is circulated within the camera apparatus body 102, it is also possible to prevent the moisture sensor and other housed assemblies from being deteriorated and consumed due to moisture.

As described above, according to the present invention, in the waterproof type electronic devices such as the disc type waterproof camera apparatus 1, 101 having the waterproof function, since the buckles 12, 112 having the openable and closable lid functions are formed with the waterproof structures and the fastening means are engaged with the electronic device body, the operation switches, the battery compartment portion and assemblies around the operation switches and the battery compartment portion need not be separately formed with the waterproof structures and hence the whole of the apparatus can be miniaturized in size. Also, when the buckles 12, 112 are closed, since the disc lid bodies 13, 113 are pulled in the inside by the buckles 12, 112, close-contact property of the buckles 12, 112 can be increased by removing the clearance corresponding to the backlash and hence it is possible to improve waterproof or water-resistant property.

Further, since the disc unloading button is located within the buckles 12, 112, it is possible to prevent the cameraman from making an error to operate the disc type waterproof camera apparatus. Specifically, when the buckles 12, 112 are closed, there is then no risk that the disc unloading button will be touched. Hence, there is then no risk that the cameraman will operate the disc unloading button unintentionally. Therefore, it is possible to prevent the cameraman from missing a recording opportunity because the disc type waterproof camera apparatus becomes unavailable during a predetermined time in order to write RED, TOC and the like. Further, while the sealing members 24, 127 are provided on the buckles 12, 112 in the above-described embodiments, the present invention is not limited thereto and the sealing members 24, 127 may be provided on the camera apparatus bodies 2, 102. Furthermore, it is possible that the disc type waterproof camera apparatus may have arrangements in which sealing members are provided on both of the buckles 12, 112 and the camera apparatus bodies 2, 102.

While the present invention is applied to the disc type waterproof (water-resistant) camera apparatus 1, 101 in the above-described embodiments, the present invention is not limited to an electronic device in which the whole of the apparatus is formed as the waterproof (water-resistant) type and may be applied to an electronic device part of which should be formed as a waterproof (water-resistant) part. Further, it is needless to say that the present invention can be applied to various kinds of electronic devices (for example, tape recording apparatus, semiconductor recording apparatus, etc.) so long as electronic devices have arrangements in which the inside and outside of the apparatus body are communicated with each other by opening the lid to introduce the air into the apparatus body so that moisture in the inside of the apparatus can be exhausted (removed).

Furthermore, the present invention can be applied to other camera apparatus than the disc type waterproof camera apparatus such as electronic still cameras, video cameras, personal computers with camera functions, mobile phones with camera functions, PHS (personal handy-phone system) with camera functions and various kinds of camera apparatus having waterproof (water-resistant) functions.

According to the waterproof type electronic device of the present invention, when the buckle is fastened and fixed to the electronic device body by urging the buckle against the electronic device body, the sealing member provided at least on one of the peripheral edge portion of the buckle and the peripheral edge portion of the opening portion of the electronic device body is closely contacted with the electronic device body or the buckle in the state in which the sealing member surrounds the opening portion and thereby at least a part of the portion covered with the buckle is hermetically closed. Therefore, the opening portion of the electronic device body can be hermetically sealed by the buckle. Thus, it is possible to provide a waterproof type electronic device having a structure excellent in waterproof (water-resistant) function by improving a waterproof function or a water-resistant function of at least a part within the buckle.

According to the waterproof type electronic device of the present invention, since the waterproof type camera apparatus to which the information recording medium is detachably attached is applied as the waterproof type electronic device having the arrangement in which the information recording medium can be exchanged when the lid is opened, the lid can be closely fastened to and fixed to the electronic device body by the buckle and the information recording medium can be exchanged with ease by opening the lid.

According to the waterproof type electronic device of the present invention, since the operation means for opening the lid covering the opening portion is located on the electronic device body at its portion hermetically covered with the buckle, waterproof function can be maintained without providing a special waterproof mechanism to the operation means. Therefore, since the operation means need not be rendered waterproof independently, the operation means can be simplified in structure and the whole of the apparatus can be kept from becoming large in size.

According to the waterproof type electronic device of the present invention, since the waterproof type electronic device includes the first operation means and the second operation means as the operation means, when the recording stop switch serving as the first operation means is operated, the second operation means is prevented from being operated by the first operation means until predetermined information is recorded on the information recording medium. After predetermined information was recorded on the information recording medium, the slide lever serving as the second operation means can be operated and the lid can be released from being locked by operating the second operation means and it becomes possible to open the lid. Thus, even when the user makes an error in operation procedure of the operation means, the lid can be prevented from being opened before necessary information is recorded on the information recording medium. Therefore, it is possible to reliably and effectively prevent the occurrence of a trouble in which necessary information is not recorded on the information recording medium.

According to the waterproof type electronic device of the present invention, since the waterproof type electronic device includes the partition member for dividing the inside space of the electronic device body into the first and second chambers and the partition member includes the air hole to communicate the first and second chambers, the second chamber hermetically covered with the buckle is communicated with the first chamber through the air hole. Thus, when the buckle is opened, the air is introduced into the electronic device body through the air hole and the moisture state in the inside can be removed in the early stage by circulating the air into the electronic device body.

Further, according to the waterproof type electronic device of the present invention, since the battery holder to which the batteries are detachably loaded is applied as the partition member, the partition member can be realized by using the existing assemblies without increasing the number of assemblies. Also, since the battery holder is provided with the air hole, the moisture state within the electronic device body can be removed quickly by only opening the buckle. Therefore, it is possible to realize the waterproof type electronic device, which can remove the moisture state quickly, by the simple structure without increasing the manufacturing cost.

Furthermore, since the electronic device body is hermetically sealed at least a part of its portion covered with the buckle by fastening the buckle when the opening portion of the electronic device body is closed by the lid, it is possible to realize the waterproof type electronic device, which can demonstrate positive and reliable waterproof function or water-resistant function, by the simple structure.

It should be understood by those skilled in the art that various modifications, combinations, sub-combinations and alterations may occur depending on design requirements and other factors insofar as they are within the scope of the appended claims or the equivalents thereof.

What is claimed is:

1. A waterproof type electronic device, comprising:
   a lid capable of opening and closing an opening portion of an electronic device body, the lid including an engagement protrusion;
   a buckle for fastening said lid to said electronic device body such that said lid can be detachably fixed to said electronic device body, the buckle including a fastening means with a roller, wherein the fastening means is detachably engaged with the engagement protrusion by means of the roller; and
   a sealing member provided on a peripheral edge of an inner surface of said buckle so as to seal said buckle and said electronic device body hermetically, wherein at least part of the portion covered with said buckle is hermetically sealed when said lid is fastened to said electronic device body by said buckle.

2. A waterproof type electronic device according to claim 1, wherein said waterproof type electronic device is a waterproof type camera apparatus for outputting an image of a shooting object in the converted form of an electric signal and which has an information recording medium, capable of recording said electric signal, detachably attached thereto, said information recording medium being made exchangeable when said lid is opened.

3. A waterproof type electronic device according to claim 2, further comprising:
   operation means for opening said lid which covers said opening portion in which said information recording medium is housed and wherein said operation means is provided on said electronic device body at its portion hermetically covered with said lid.

4. A waterproof type electronic device according to claim 3, wherein said operation means includes first operation means and second operation means, said first operation means being composed of a recording stop switch energized to output a signal instructing predetermined information to be recorded on said information recording medium and which immediately energizes said second operation means after recording of said predetermined information was ended or after recording of said predetermined information has been ended, said second operation means being composed of a slide lever energized to release said lid from being locked to open said lid when said second operation means can be made operable by said first operation means.

5. A waterproof type electronic device according to claim 2, wherein said electronic device body has in its inside a partition member for dividing its inside space into a first chamber to house therein said information recording medium and which is covered with said lid and a second chamber hermetically covered with said buckle, said partition member having an air hole by which said first and second chambers communicate with each other.

6. A waterproof type electronic device according to claim 5, wherein said partition member is a battery holder to which a battery is detachably attached as a power supply.

* * * * *